US012762145B2

(12) United States Patent
Bilbao, Jr.

(10) Patent No.: US 12,762,145 B2
(45) Date of Patent: Oct. 13, 2026

(54) SYSTEM AND METHOD FOR DYNAMIC AI-DRIVEN PROCESSING OF COMPLEX INTERACTIONS

(71) Applicant: Rivulet AI LLC, Philadelphia, PA (US)

(72) Inventor: Alvaro Bilbao, Jr., Jersey City, NJ (US)

(73) Assignee: Rivulet AI LLC, Philadelphia, PA (US)

( * ) Notice: Subject to any disclaimer, the term of this patent is extended or adjusted under 35 U.S.C. 154(b) by 0 days.

(21) Appl. No.: 19/427,229

(22) Filed: Dec. 19, 2025

(65) Prior Publication Data

US 2026/0178605 A1 Jun. 25, 2026

Related U.S. Application Data

(60) Provisional application No. 63/736,811, filed on Dec. 20, 2024.

(51) Int. Cl.
*G06F 15/16* (2006.01)
*G06F 16/21* (2019.01)
(Continued)

(52) U.S. Cl.
CPC .......... *G06F 16/258* (2019.01); *G06F 16/213* (2019.01); *G06F 16/243* (2019.01)

(58) Field of Classification Search
None
See application file for complete search history.

(56) References Cited

U.S. PATENT DOCUMENTS 7,860,901 B2 12/2010 Cheng
10,157,350 B2 12/2018 M R
(Continued)

FOREIGN PATENT DOCUMENTS

CN 120428976 A 8/2025

OTHER PUBLICATIONS

Indian Patent Application, App. No. IN202511058006, Applicant: Chandigarh University, dated Jun. 3, 2025, Title: AI-Driven Personalized Wellness Platform Integrating Nutrition Analysis, Mood Tracking, and Motivational Tools, 13 pages.
(Continued)

*Primary Examiner* — Alex Gofman
(74) *Attorney, Agent, or Firm* — Blueshift IP; Robert Plotkin

(57) ABSTRACT

A method and system for dynamically processing complex user interactions through artificial intelligence receives an input comprising natural language content spanning at least one functional domain. The method analyzes the input to identify organizing units relevant to the input. For organizing units not existing within a system database, the method enters a requirements gathering mode to obtain additional information from a user, generates a specification for creating the organizing unit, and transforms the specification into executable database operations. The method processes the input using an artificial intelligence processing framework to generate structured output data, dynamically generates a unified interactive interface comprising sections corresponding to each organizing unit, maintains persistent state data and contextual continuity, and dynamically updates interface sections in response to subsequent user interactions.

18 Claims, 4 Drawing Sheets

(51) Int. Cl.
*G06F 16/242* (2019.01)
*G06F 16/25* (2019.01)

(56) References Cited

U.S. PATENT DOCUMENTS

| | | | | |
|---|---|---|---|---|
| 10,360,066 | B2 | 7/2019 | Suparna | |
| 10,943,072 | B1 | 3/2021 | Jaganmohan | |
| 11,120,217 | B2 | 9/2021 | Maes | |
| 12,111,859 | B2 | 10/2024 | Siebel | |
| 12,346,663 | B2 | 7/2025 | Chakraborti | |
| 2015/0347503 | A1* | 12/2015 | Kumaran | G06F 16/3322 707/767 |
| 2022/0414478 | A1 | 12/2022 | Karri | |
| 2023/0237063 | A1* | 7/2023 | Cejudo | G06F 16/256 707/602 |
| 2024/0160685 | A1* | 5/2024 | Esun | G06F 16/9577 |
| 2024/0281472 | A1 | 8/2024 | Larhette | |
| 2024/0362036 | A1 | 10/2024 | Jacob | |
| 2024/0364763 | A1* | 10/2024 | Wang | G06F 16/176 |
| 2025/0061528 | A1 | 2/2025 | Beaty | |
| 2025/0138845 | A1* | 5/2025 | Syed | G06F 9/451 |
| 2025/0156217 | A1* | 5/2025 | Silverstein | G06F 9/542 |
| 2025/0390526 | A1* | 12/2025 | Kundel | G06F 16/3344 |

OTHER PUBLICATIONS

Indian Patent Application, App. No. IN202531090229, Applicant: Rahul Kumar Singh et al., dated Sep. 22, 2025, Title: Method for Intelligent Workflow Automation Using Artificial Intelligence, 15 pages.
Indian Patent Application, App. No. IN202541056419, Applicant: CVR College of Engineering, Title: Context-Aware Multi-Agent AI System for Real-Time Collaborative Problem Solving Using Natural Language Interfaces, (2025) 12 pages.
Indian Patent Application, App. No. IN202541062971, Titled: System and Method for Intelligent, Context-Aware AI Assistants to Enhance Employee Engagement and Automate Enterprise Workflow Integration, (2025) 18 pages.
Indian Patent Application, App. No. IN202541078792, Titled: Artificial Intelligence-Based Adaptive Virtual Assistant for Contextual Task Automation, (2025) 4 pages.
International Search Report and Written Opinion issued in App. No. PCT/US2025/060593, dated Apr. 20, 2026 (pp. 1-10).

* cited by examiner

SYSTEM AND METHOD FOR DYNAMIC AI-DRIVEN PROCESSING OF COMPLEX INTERACTIONS

CROSS-REFERENCE TO RELATED APPLICATIONS

This application claims priority to U.S. Provisional Patent Application No. 63/736,811, filed on Dec. 20, 2024, entitled, "System and Method for Dynamic and Continuous AI-Driven Processing of Complex Interactions," which is incorporated by reference herein.

BACKGROUND

Current artificial intelligence (AI) interface systems face significant limitations that create substantial inefficiencies in how users interact with and leverage AI technology. Traditional approaches to AI implementation have resulted in fragmented, inflexible systems that struggle to effectively process complex user inputs while maintaining contextual awareness across interactions. These limitations manifest across multiple aspects of AI system architecture and user experience, from basic input processing to interface generation and state management. While individual solutions exist for specific challenges, the market currently lacks comprehensive frameworks that can effectively orchestrate complex AI-driven user experiences while maintaining contextual continuity. This gap is particularly evident in enterprise and productivity applications where complex, multi-capability interactions are common. What is needed, therefore, are solutions that address these and other shortcomings of existing AI applications.

For example, existing AI-based systems impose significant cognitive burden on users through mandatory manual navigation, context management, and repetitive data entry tasks. Users must navigate through complex webs of menus, pages, and search functions to access different capabilities, creating substantial overhead when attempting to accomplish multiple related tasks. This fragmented approach requires users to maintain mental models of system state while manually coordinating transitions between different functions and capabilities.

The excessive cognitive effort required by current systems manifests in several ways. First, users must dedicate significant time and attention to basic operational tasks, such as manual data entry and navigation between disconnected interfaces. This diverts focus from higher-value strategic activities and creates inefficiencies in workflow management.

Second, users are forced to repeatedly reestablish context when moving between different system components, as current implementations lack the ability to maintain contextual awareness across sequential interactions.

Traditional graphical user interfaces compound these issues by dispersing functionality across multiple disconnected interfaces and components. Users must navigate between separate pages, menus, and applications to access different capabilities, preventing the establishment of centralized access points for system functionality. This fragmentation creates inefficiencies and breaks in workflow continuity as users switch between disparate interfaces to accomplish related tasks.

The cognitive burden is particularly evident in enterprise and productivity applications where complex, multi-capability interactions are common. Current implementations require users to manually piece together workflows across disconnected interfaces while maintaining awareness of system state and previous actions. This creates significant inefficiencies as users spend excessive time on low-value operational tasks rather than focusing on strategic objectives.

Furthermore, existing AI systems face significant limitations in processing complex inputs that span multiple distinct tasks or commands. While simple one-to-one interactions can be handled effectively, current implementations struggle to reliably process and coordinate multiple simultaneous requests, leading to incomplete or unreliable results when handling complex "many-to-many" commands.

The absence of standardized processing methodologies results in unpredictable handling of inputs across different system components and capabilities, creating reliability issues particularly when attempting to coordinate multiple capabilities simultaneously.

In addition, existing systems demonstrate limited reliability in aligning user inputs with appropriate technological capabilities. Current implementations lack robust frameworks for parsing and aligning user requests with appropriate system capabilities, resulting in unreliable processing and incomplete results. This limitation is particularly evident when processing inputs that require specialized expertise across multiple capability domains.

Context management presents another critical challenge in current AI interface systems. Traditional chat-based AI interfaces struggle to preserve context when users attempt to interact with AI-generated outputs, requiring users to repeatedly reestablish context for related interactions. Contemporary implementations typically operate with a moving context window, progressively losing information as interactions continue. This forces users to manually preserve and reestablish context, often through inefficient workarounds like copying and pasting previous interactions.

The absence of persistent state management compounds these context-related challenges. Current systems frequently lose data and context while users navigate between different capabilities and interfaces, creating discontinuity in user workflows and requiring manual reconstruction of previous states. This limitation is particularly problematic in enterprise and productivity applications where complex, multi-capability interactions are common. Users must manually track and reestablish their progress when moving between different system components, creating significant inefficiencies in workflow management.

Furthermore, existing systems implement capabilities as isolated, siloed components that operate independently of each other. Current approaches implement AI features as disparate, tactical expansions of existing functionality, creating fragmented architectures that lack cohesive integration.

The prevalent segregation of functionality means that features and capabilities exist in separate technological spaces with limited ability to communicate or coordinate. This siloed approach prevents dynamic connections between related capabilities and forces users to manually bridge the gaps between different system functions.

The lack of comprehensive frameworks for managing expanding system capabilities compounds these architectural challenges. While individual solutions exist for specific challenges, there is no unified approach that addresses the full spectrum of needs for modern AI-driven applications.

Current AI implementations also lack the architectural foundations needed to scale effectively across expanding system capabilities. The absence of standardized communication protocols between different system components prevents cohesive orchestration between different parts of the system, resulting in fragmented processing and limited integration capabilities.

Interface limitations present additional significant challenges in current systems. Contemporary implementations rely heavily on pre-configured, static interface components that lack the flexibility to adapt to varying user contexts and requirements. Traditional systems maintain fixed interfaces that fail to evolve based on real-time user needs and interactions, limiting their ability to provide contextually appropriate experiences. Current technical landscapes focus primarily on basic chatbot interfaces or pre-configured components, offering limited ability to handle complex graphical and technical interactions.

These interface constraints are particularly evident in how current systems handle multi-capability inputs. Existing architectures demonstrate significant rigidity in their ability to adapt across different capabilities, forcing users to work within predetermined pathways rather than having interfaces that adapt to their specific needs.

Existing AI systems operate primarily as transactional tools, processing individual requests in isolation rather than engaging in meaningful collaboration with users. As a result, the AI's role is limited to basic task execution rather than active partnership in achieving user objectives. The limitations in collaborative capabilities are particularly evident in how current systems handle complex user-AI interactions. Existing implementations lack the sophisticated frameworks needed to support extended collaborative sequences, forcing interactions to remain at a basic, transactional level.

Current systems demonstrate significant limitations in their ability to scale and expand capabilities effectively. For example, traditional tactical AI implementations lack the architectural foundations needed to scale and connect across expanding system capabilities, preventing cohesive growth as system requirements evolve. In particular, the prevalent approach of implementing AI as isolated tactical features rather than systematic architectural components creates substantial barriers to scalability. Current technical landscapes implement AI primarily as disconnected additions that fail to provide comprehensive support for user workflows and system functionality.

These scalability constraints are particularly evident in enterprise environments where systems must continuously evolve to support expanding capabilities and user requirements. The lack of systematic frameworks for growth means that each new capability addition potentially increases system fragmentation and complexity, further degrading the user experience and system maintainability.

Current systems require users to dedicate significant time and attention to managing repetitive operational tasks, creating substantial inefficiencies in workflow management and task prioritization. Users must manually coordinate and execute routine activities, diverting valuable time and cognitive resources from higher-value strategic objectives. This limitation is particularly evident in enterprise environments where users must manage numerous repetitive tasks across multiple system components and capabilities.

What is needed therefore, are solutions that address these and other shortcomings of existing AI applications.

SUMMARY

A method and system for dynamically processing complex user interactions through artificial intelligence receives an input comprising natural language content spanning at least one functional domain. The method analyzes the input to identify organizing units relevant to the input. For organizing units not existing within a system database, the method enters a requirements gathering mode to obtain additional information from a user, generates a specification for creating the organizing unit, and transforms the specification into executable database operations. The method processes the input using an artificial intelligence processing framework to generate structured output data, dynamically generates a unified interactive interface comprising sections corresponding to each organizing unit, maintains persistent state data and contextual continuity, and dynamically updates interface sections in response to subsequent user interactions.

Other features and advantages of various aspects and embodiments of the present invention will become apparent from the following description and from the claims.

DETAILED DESCRIPTION

Embodiments of the present invention are directed to an AI Interaction Matrix (AIM) system that enables seamless, dynamic, and continuous engagement between users and artificial intelligence to accomplish complex tasks efficiently and reliably. Embodiments of the present invention include novel architectural frameworks for complex processing, dynamic generation, and continuous evolution that work together to create cohesive, AI-driven user experiences. The system processes a wide array of multi-modal inputs, including simple one-to-one inputs and complex many-to-many natural language entries through a Matrix Process Network (MPN) that enhances raw user inputs with contextual data, instructions, and AI data structure to create rich interactions. These interactions are processed through specialized AI agents that intelligently parse and align inputs with relevant capabilities, generating dynamically assembled landscapes that adapt to user needs. The system maintains ongoing access to AI with contextual continuity throughout user sessions while preserving auxiliary content, enabling truly persistent and responsive experiences that continuously adapts landscapes in real-time across multiple devices and applications. Through its innovative frameworks and methodologies, the system fundamentally reimagines how users interact with AI-driven technology by positioning AI as a centralized, continuous resource that delivers capabilities directly to users rather than requiring manual navigation through traditional interface elements.

Figure 1:
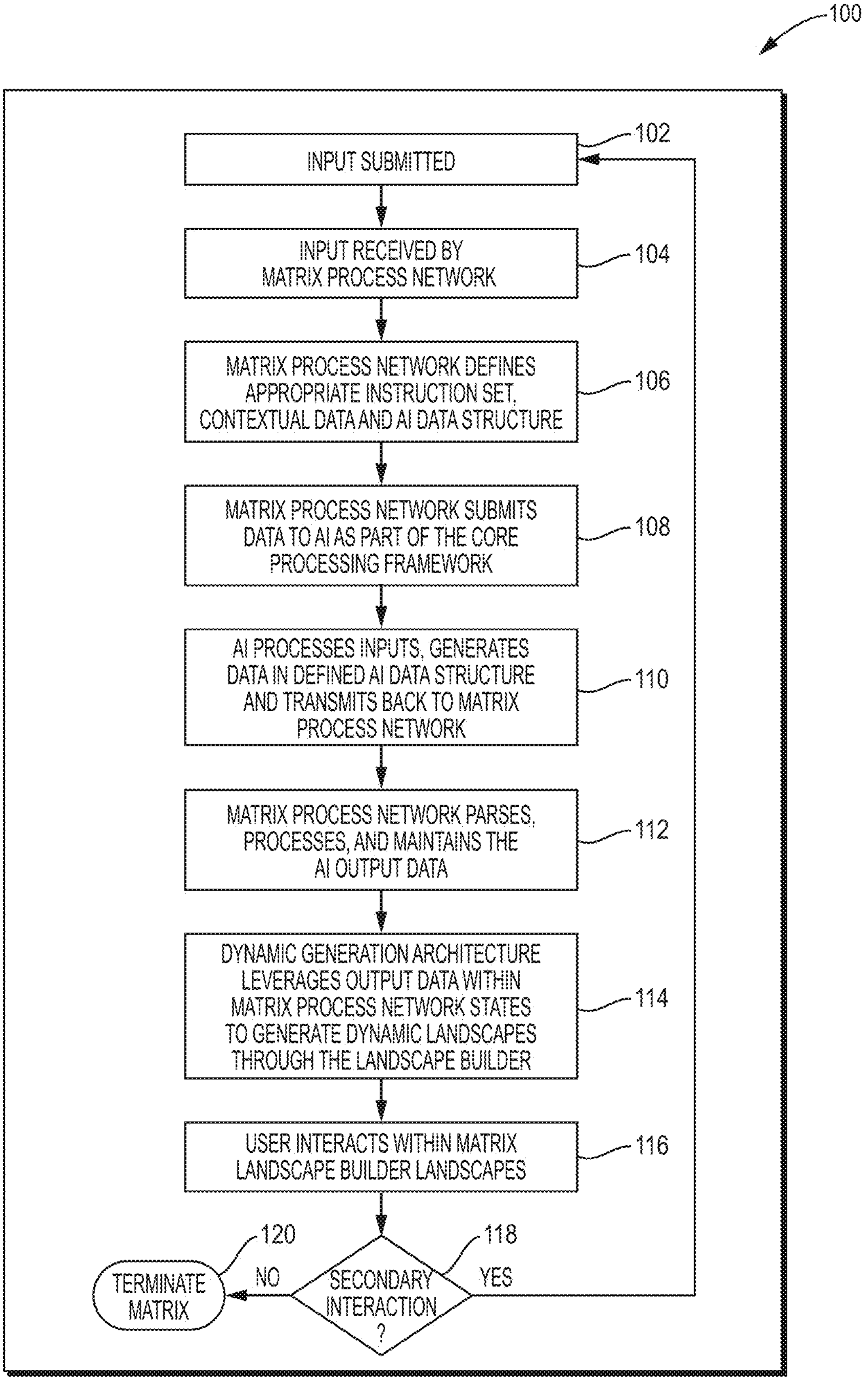
FIG. 1 is a flowchart of a method performed by one embodiment of the present invention.

FIG. 1 illustrates a flowchart of a method 100 performed by an embodiment of the present invention, showing the high-level process flow of the AI Interaction Matrix system from initial input submission through matrix termination. As will be described in more detail below, the method 100 includes steps for processing inputs through the Matrix Process Network (MPN), generating appropriate instruction sets, contextual data, and AI data structure, and enabling continuous user interaction within dynamically generated landscapes.

Figure 2:
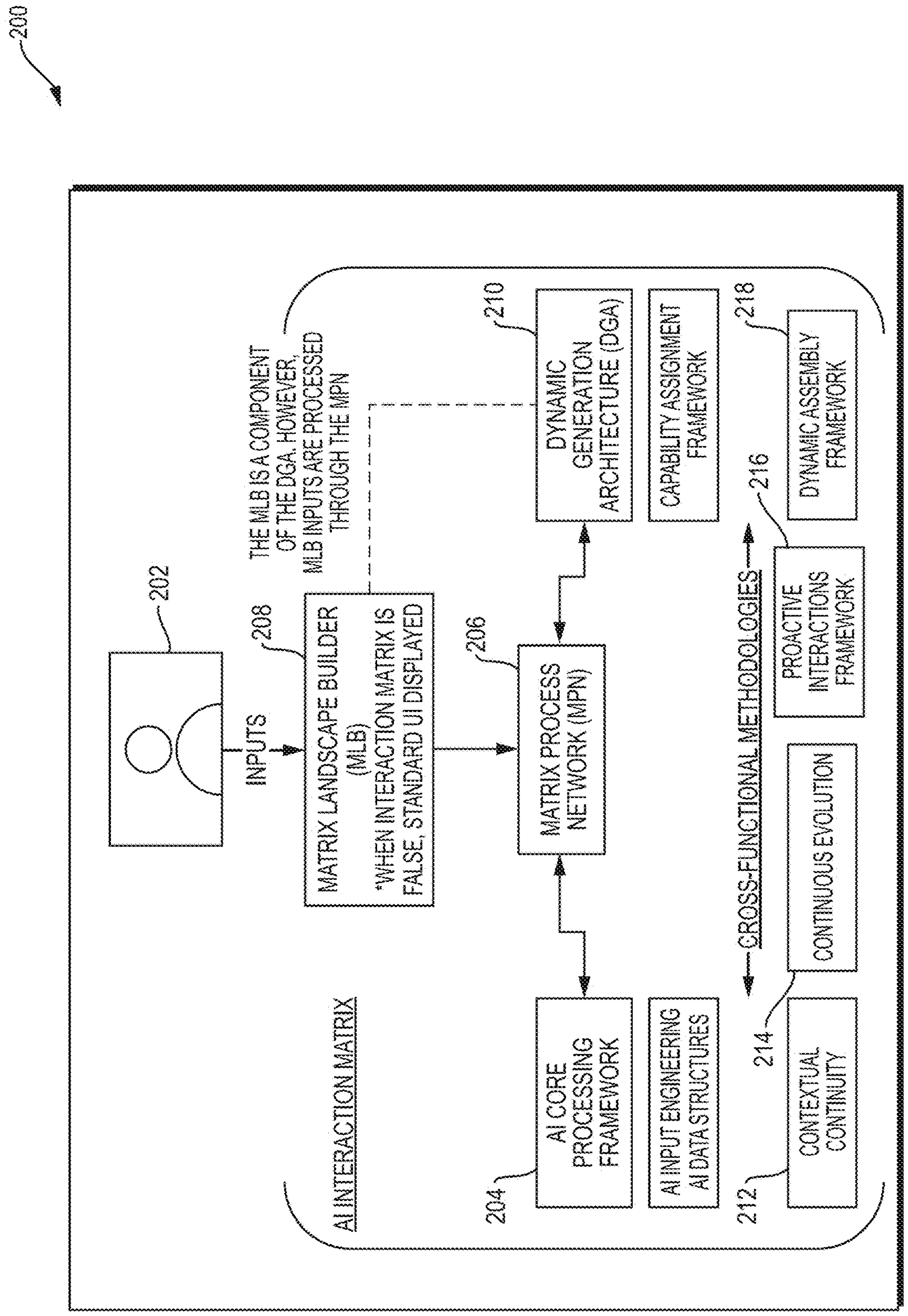
FIG. 2 is a diagram of a system implemented according to one embodiment of the present invention.

FIG. 2 depicts a diagram of a system 200 which shows the core architectural components and frameworks that implement the AI Interaction Matrix, including the AI Core Processing Framework (CPF) 204, Dynamic Generation Architecture (DGA) 210, Matrix Process Network (MPN) 206, Matrix Landscape Builder (MLB) 208, and supporting methodologies that enable contextual continuity and continuously evolving matrix functionality. As will be described in more detail below, the CPF 204 facilitates the system 200's ability to process complex inputs and "speak" in a technology's language, the DGA 210 orchestrates the technology's delivery of that output as a dynamic and cohesive user experience, and the MPN 206 serves as the behind-the-scenes infrastructure connecting the CPF 204 and the DGA 210. The components of the system 200 work together to process inputs, maintain contextual awareness, and deliver dynamically generated capabilities through the Matrix Landscape Builder 208.

Before describing the method 100 performed by the system 200 in detail, certain features of components of the system 200 will be described, beginning with the Matrix Process Network (MPN) 206. The MPN 206 functions as the "nervous system" of the AI Interaction Matrix (AIM) system 200, orchestrating the dynamic and adaptive user experience. The MPN 206 is a collection of processes, actions, states, and components that together form the technical backbone of the AIM system 200. The MPN 206 facilitates the consumption of inputs and choreographs the system 200's responses, integrating the AI Core Processing Framework (CPF) 204 and Dynamic Generation Architecture (DGA) 210 into a cohesive, interactive experience.

Unlike traditional GUI systems, in which actions are page-specific and isolated, the MPN 206 ensures that all actions within the AIM system 200 are evaluated holistically and orchestrated as part of the broader user experience. Although each framework on its own may be inert, the MPN 206 serves as the orchestrator, creating a symbiotic relationship between the frameworks to deliver a seamless and responsive interaction matrix.

An important function of the MPN 206 is to transmit interactions to the CPF 204. The MPN 206 accomplishes this by capturing the starting input while simultaneously determining the accompanying Instruction Set, Contextual Data, and AI Data Structure. This mechanism underpins what is referred to herein as the Contextual Continuity Methodology (CCM) 212, providing AI with the "contextual awareness" to process inputs relative to the user's journey within the AIM system 200. In addition, what are referred to herein as AI Data Structures ensure that AI outputs are compatible with the shared language of the MPN 206 and the DGA 210.

The MPN 206 also incorporates a Persistence Methodology to preserve auxiliary content within the matrix of the MPN 206 until the user 202 is ready to engage with it. This approach allows users the freedom to prioritize, explore, and navigate other aspects of the matrix without risking loss or disruption of content, fostering a flexible and adaptive environment.

The AI Core Processing Framework (CPF) 204 functions as the "brain" of the AI Interaction Matrix system 200, enabling AI agents to intelligently parse and process complex inputs into structured output schemas aligned with technological capabilities. The CPF 204 processes user inputs by combining them with matrix-based guidance, which includes instruction sets that are optimized for technology capabilities and contextual data tailored to the user's journey. This approach equips AI systems with the precise knowledge required to enable and enhance interaction matrix experiences.

The CPF 204 ensures that all inputs—whether singular and focused or complex and multi-faceted ("many-to-many")—are reliably transformed into the appropriate capabilities, providing consistent and dependable results.

The CPF 204 works in conjunction with the AI Data Structures methodology, which provides structured data schematics ensuring seamless communication between the CPF 204, MPN 206, and DGA 210. This integration enables the CPF 204 to consistently align complex user inputs with appropriate technological capabilities while maintaining reliable processing across all interaction types.

The CPF 204 may be expressed in one of two Models. Both models share the same foundational technologies but represent distinct approaches to input processing within the Core Processing Framework. Model 1 consolidates processing into a single, central AI agent. This agent operates using a robust instruction set provided by the Matrix Process Network (206) to manage all possible technological capabilities. Model 2, in contrast, employs a two-stage processing approach involving two or more AI agents. In the first stage, a "Capability Identification AI" analyzes the input, identifies the invoked capabilities, and generates supporting data—such as Dynamic AI expertise—to enrich and tailor the Matrix Process Network (206) instructions and context data. In the second stage, the enriched package is leveraged by one or more "Capability Processing AI" to process the input against the identified technological capabilities, producing the final output. While Model 1 offers simplicity and efficiency, Model 2 provides a more complex but scalable architecture, enabling AI responses to be uniquely tailored to each input for enhanced adaptability and precision.

The Dynamic Generation Architecture 210 (DGA) functions as the "stage" of the AI Interaction Matrix system 200, armed with the processes to coordinate a technology's graphical and technical landscape elements. The DGA 210 is responsible for the dynamic orchestration of these elements into a cohesive and adaptive end-to-end user experience across capabilities. It does so by translating AI Data Structures into dynamically generated landscapes tailored to each input's unique requirements. This framework ensures that the receiving technology adapts fluidly to deliver the appropriate matrix for any given context.

The landscape generation process involves: taking the CPF 204 output, parsing the data for invoked capabilities, and creating unique landscapes for each capability.

The DGA 210 works in conjunction with the Matrix Landscape Builder 208 to generate landscapes at three distinct levels:

Capability Landscape: The set of elements for a single capability

Matrix Landscape: The collective elements for all invoked capabilities

Technology Landscape: The complete catalog of elements across all capabilities

Through its integration with the MPN 206 and the CPF 204, the DGA 210 ensures that landscapes are dynamically generated and adapted while maintaining contextual continuity throughout the user experience. This creates a fluid and responsive system that can scale across multiple applications and devices while preserving context and user progress.

The Contextual Continuity Methodology (CCM) 212 is a fundamental feature of the AI Interaction Matrix system 200 that enables AI to establish and maintain ongoing awareness of a user's "location" within the interaction matrix, along with the context and objects they have interacted with. This continuous contextual awareness allows the system 200 to process inputs appropriately based on their location within the matrix without requiring users to repeatedly specify or reestablish context for related interactions.

The technical implementation of the CCM 212 operates through an interplay between core system components. For example, the MPN 206 leverages data received from the DGA 210 to establish the precise input location and context within the matrix. The MPN 206 establishes this by isolating the originating CPF 204 outputs that generated the precise landscape location and object elements the user interacts with within the DGA 210 and MLB 208. Since CPF 204 output are communicated in a defined AI data structure (explained later in this document) that serves as a "shared language" between all components of the system 200, the MPN 206 can leverage this originating output to dynamically define and precisely communicate supporting contextual data to the CPF 204 in a manner that ensures that the AI "understands" the originating context of all follow up inputs for continued and seamless processing. This mechanism ensures that all user interactions are cohesively processed with an understanding rooted in the broader interaction matrix context.

The CCM's 212 significance stems from its novel approach to improving user experience and its cross-functional scope across all three core technologies of the system 200. For example, when the user 202 submits a secondary interaction to modify previously entered information, such as changing "one banana" to "two bananas," the CCM 212 enables the system 200 to understand which item is being modified based on maintained contextual awareness, without requiring explicit specification from the user 202.

Through this comprehensive approach to context management, the CCM 212 addresses several critical limitations of traditional systems. It ensures continuous contextual awareness across user interactions, maintains user progress despite context shifts, and enables complex inputs to become continuous, unified workflows through persistent AI awareness. This methodology represents a fundamental advancement in how AI systems maintain and leverage context throughout user interactions, eliminating the need for users to repeatedly establish context while enabling more natural and efficient interaction patterns.

The Matrix Landscape Builder (MLB) 208 dynamically assembles and presents landscapes for user interaction while ensuring seamless, ongoing access to AI. It serves as a master-level component within the AI Interaction Matrix system 200 that contains elements spanning multiple or all system capabilities. The MLB 208 houses the UI components, data structures, technical functions, and processing elements needed for different capabilities, functioning as a master template that can be dynamically assembled to meet specific interaction requirements.

The MLB 208 generates the user 202's graphical and technical experience by working in conjunction with the DGA 210. When the DGA 210 provides parsed and processed data to the MLB 208, the MLB 208 uses this data to conditionally activate and assemble pre-configured components based on the specific capabilities being invoked. For example, when processing an input containing both meal and activity data, the MLB 208 would retrieve the appropriate UI components and data structures for each capability, populate these components with the corresponding output data, and assemble them into capability-specific landscapes.

The MLB 208 represents a novel technological advancement in that it uniquely expresses the DGA 210, while simultaneously shaping the user 202's view of the AI experience and housing the user touchpoints with the MPN 206. This unified approach enables the MLB 208 to build cohesive landscapes that serve as the user 202's "one-stop-shop" while dynamically connecting features to overcome the segregated and disparate functionality prevalent in traditional technical landscapes.

The MLB 208's scaffolding may be enhanced through the Dynamic Assembly Framework 218, which enables AI to assemble entirely unique elements "on-the-fly" by enhancing generation from the component level to individual field levels. This enhancement allows the system 200 to have total dynamic influence over the user experience, creating ad-hoc widgets and screens based on specific interaction requirements.

The Continuous Evolution Framework (CEF) 214 provides a unified interaction and design architecture that enables continuous evolution and responsiveness within the AI Interaction Matrix system 200. The CEF supports secondary interactions by empowering users to engage seamlessly with AI throughout their journey within the matrix. Working in conjunction with the Contextual Continuity Methodology 212, the CEF ensures the AI maintains continuous awareness of the user 202'2 "location" and context within the matrix, enabling intuitive and seamless ongoing engagement.

The CEF leverages the core technologies (MPN, CPF, and DGA) to evolve the user experience beyond initial matrix generation. When the user 202 submits a secondary interaction, the Matrix Process Network 206 defines supporting instructions and contextual data for AI Core Processing Framework 204 processing. The complexity of the secondary interaction determines the extent of matrix modification required. For simple secondary interactions, the framework processes basic modifications, while complex secondary matrix Interactions may trigger broader matrix landscape changes.

The output schema of the CEF includes detailed specifications for matrix modifications, including:

Which capabilities should be added, modified, or removed

How existing capability data should be modified or overridden

The newly processed capability data

By integrating layered interactions, contextualized AI engagement, and content persistence, the CEF ensures the interaction matrix, and its landscapes, evolves harmoniously with the user 202's journey. Rather than generating isolated outputs for each input, the CEF enables inputs to spawn "trees" of possible outcomes and experiences, fostering truly cohesive, goal-oriented collaboration between users and AI. The CEF addresses several critical limitations of traditional systems:

It overcomes static interaction models by enabling continuous AI engagement and matrix evolution It elevates AI from a transactional tool to an active collaborator by supporting complex collaborations It preserves user progress and integrates auxiliary content for uninterrupted workflows It prevents loss of data or context during complex matrix navigation It enables seamless processing of secondary interactions, even for multi-faceted inputs Through this approach to continuous evolution, the CEF delivers an immersive, adaptive, and advanced user experience that remains responsive to users'evolving needs and objectives throughout their interaction journey.

Another feature of the system 200 is the AI Input Engineering (AIE) methodology, which optimizes AI processing by combining user inputs with matrix-based guidance. The AIE includes robust instruction sets optimized for technology capabilities and contextual data tailored to the user 202's journey. The AIE equips AI systems with precise knowledge required to enable and enhance interaction matrix experiences.

The AIE methodology operates through defined instruction schemas that "explain" to the AI its role, the inputs and their matrix context, available technology capabilities, and specific processing instructions. The AIE methodology may include defining an AI Persona as part of the instruction schema, which provides the AI with a structured framework for its role and purpose within the supporting technology. The AI Persona outlines the AI's areas of expertise, voice and style guidelines, and other parameters that help increase processing accuracy, maintain consistent user experiences, and reduce processing anomalies.

In Model 2 architecture implementations, AIE supports Dynamic Expertise capabilities. This approach enables the initial Capability Identification AI to analyze inputs and dynamically craft additional supporting instructions and expertise, supplementing the base instructions provided by the Matrix Process Network 206. These dynamically generated instructions are then leveraged by the subsequent Capability Processing AI. Studies have confirmed that this approach of providing tailored instructions and expertise significantly increases the quality and relevance of AI output, ensuring that every user input is processed by an AI expert in the relevant subject matter.

The AIE methodology addresses several critical limitations of traditional systems:

- It optimizes input parsing through matrix-guided instruction sets, enabling reliable processing of complex inputs
- It ensures robust alignment between user inputs and system capabilities, with Dynamic Expertise supporting increased accuracy
- It incorporates contextual data into processing to maintain continuity throughout user interactions The AIE enables the AI Core Processing Framework 204 to reliably and continuously understand inputs as the 202's matrix journey evolves. This capability represents a significant advancement in AI processing methodology, leveraging unique technical expertise in prompt engineering to enhance the overall interaction matrix experience.

The system 200 also includes an AI Data Structures (ADS) methodology, which provides a structured data schematics approach that creates a consistent, scalable, and consumable data model for the AI Interaction Matrix system 200. The ADS methodology serves as the shared language that unifies communication between the AI Core Processing Framework 204, Matrix Process Network 206, and Dynamic Generation Architecture 210, ensuring seamless orchestration between these core components.

The ADS implements a tiered data model architecture that the Matrix Process Network, Dynamic Generation Architecture and Landscape Builder leverage for their activities. Level One defines the Matrix Landscape by specifying:

- Capabilities invoked for a given interaction matrix
- AI-processed data related to the capability at large (e.g., comments)

Level Two assembles the appropriate Capability Landscapes. Capability Landscapes are composed of preconfigured scaffolds (e.g., UI components, Actions, Queries, etc.). Level Two data specify:

- The preconfigured scaffolds the Matrix Landscape Builder 208 will call
- The preconfigured MPN processes that will be tied to the landscapes
- The landscape logic (tied to the AI data structure) that routes Level Three data to appropriate places Level Three provides specific data details to be leveraged by each of the landscape scaffolds.

The Dynamic Assembly Framework 218 extends this data structure methodology by breaking down scaffolds from component level (e.g., a widget) to individual field levels. This approach enables the AI to have total dynamic influence over the user experience, creating "ad-hoc" widgets and screens based on the data or outputs it provides.

For example, consider how the tiered data model processes a complex input involving meal and check-in capabilities:

- Level One (Matrix Landscape Definition):
  - Identifies invoked capabilities: Meals and Check In
  - Contains AI-processed capability data:
    - Generated comments for Meals capability
    - Generated comments for Check In capability
- Level Two (Capability Landscape Assembly):
  - For the Check In capability:
    - Identifies required UI Component Package A
    - Identifies required Element B
    - Prepares required Query C
  - Each component includes associated MPN processes and scaffold logic for data routing
- Level Three (Detailed Data Implementation):
  - For UI Component Package A:
    - Generates 4 instances of the component
    - Populates fields D, E, and F based on preconfigured scaffold logic
  - For Element B:
    - Generates 1 instance
  - For Query C:
    - Implements using parameter Y as the query basis The Dynamic Assembly Framework 218 extends this further by enabling field-level component assembly. For example, in a use case where AI determines the need to dynamically generate a unique meal entry widget in response to a user input, the AI might generate an ad-hoc widget containing:

- A date input field
- A "Meal Name" text entry field
- A "Meal Type" selection interface with buttons for:
  - Breakfast
  - Lunch
  - Dinner
  - Snack This example demonstrates how the tiered model progressively refines data from high-level capability identification through specific implementation details, while the Dynamic Assembly Framework 218 enables even more granular control over interface generation.

The ADS methodology addresses several critical limitations of traditional systems:

- It ensures reliable outputs that can be consistently consumed by system capabilities through standardized processing It overcomes siloed capabilities by providing a shared language between frameworks that enables cohesive orchestration It expands beyond narrow AI outputs by providing structured outputs that integrate seamlessly into broader workflows It unifies communication between core system components through comprehensive frameworks The capability landscapes generated by the system may not be fixed for a given capability, but rather may vary based on the specific interaction type and context. For example, when processing meal-related inputs, different landscapes may be generated for the same meals capability depending on whether the interaction involves meal entry versus meal querying. In the case of meal entry, Level Two data may invoke UI components and data structures for inputting meal information. However, if a user submits an interaction querying meal history (e.g., asking when they last ate a particular food), Level Two data may instead invoke landscape elements related to meal querying functionality, resulting in entirely different graphical and technical elements being assembled for the same underlying capability. This dynamic landscape generation applies across all interaction types, whether initial matrix interactions or secondary interactions, enabling the system to present the most appropriate interface elements based on the specific interaction context while maintaining consistent capability-level processing.

The system 200 also includes a Capability Assignment Framework (CAF), which provides a flexible framework that empowers users with greater control over how capabilities are sequenced and experienced within the matrix landscape. The role of the DGA is orchestrate invoked capability landscapes into a unified and logical end-to-end user experience. The CAF extends the DGA's functionality by supporting user customization through multiple capability sequencing options.

The CAF may implement any one or more of the following three distinct approaches to capability sequencing:

Predefined Order enables users to establish their preferred processing sequences in advance through a dedicated UI component. The Active Capability assignment process is conditioned to follow this user-defined ranking rather than using a preset sequence.

Simultaneous Activation enhances the Active Capability Assignment process to support evaluation and selection of multiple capabilities concurrently. This modification moves beyond simple If/Else statement assignments to enable parallel capability processing. The Landscape Builder process conditions are similarly enhanced to support evaluation and selection of multiple capabilities rather than sole assignment.

On-Demand Selection modifies the Active Capability Assignment Process to enable direct user control over capability activation through single or multi-select interface elements. This approach allows users to dynamically maintain the Active Capability state based on their immediate needs.

Figure 3:
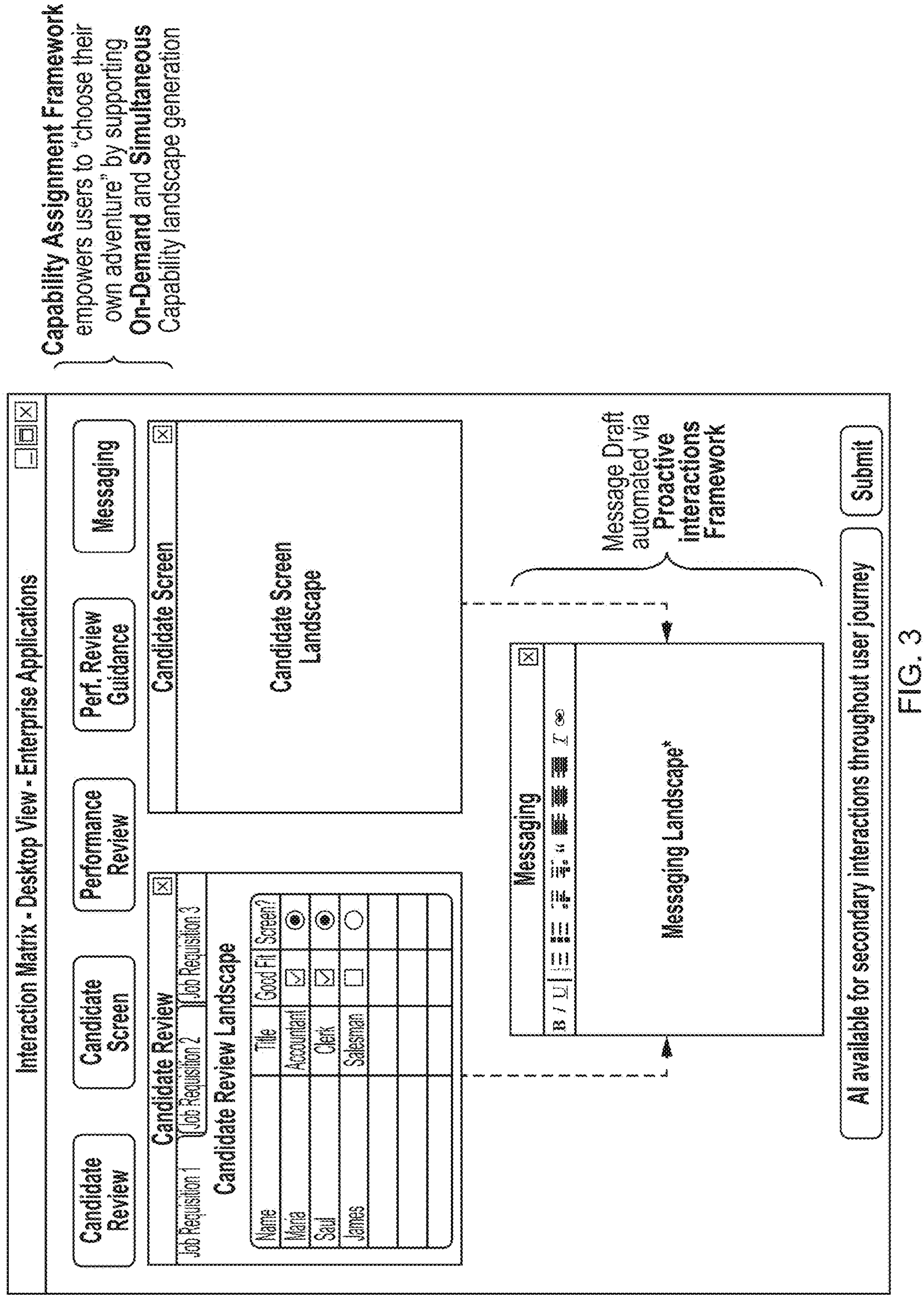
FIG. 3 is a diagram illustrating an example user interface for implementing the Capability Assignment Framework within an enterprise application in one embodiment of the present invention.

An example user interface for implementing the Capability Assignment Framework within an enterprise application is shown in FIG. 3.

Implementing the CAF may include making modifications to both the Active Capability Assignment Sub-Process (housed within the DGA) and Matrix Landscape Builder components. Rather than using hard-coded assignment logic, the system 200 may implement flexible processing conditions that support the desired sequencing option.

The CAF addresses two critical limitations of traditional systems:

It overcomes rigid architectures by empowering users with direct control over capability sequencing It reduces fragmented user experiences by enabling flexible capability prioritization that aligns with natural user workflows Through these enhancements, the CAF transforms the static, predetermined flow of traditional systems into a dynamic experience that adapts to user preferences and working patterns.

The system 200 may also include a Dynamic Assembly Framework (DAF), which provides an advanced framework that enables AI to assemble entirely unique elements or landscapes "on-the-fly," transcending the limitations of pre-configured components. This innovative approach ensures adaptability to unanticipated user needs by delivering bespoke solutions tailored to unique scenarios.

While in some embodiments the Dynamic Generation Architecture and Matrix Landscape Builder may be structured with widget-level scaffolds, the DAF may enhance these components to incorporate field-level scaffolds. This enhancement empowers the AI to pick and choose individual fields in the creation of totally unique widgets for interaction-level use cases.

The DAF extends the tiered data structure methodology by breaking down scaffolds from component level to individual field levels. This granular approach enables the AI to have total dynamic influence over the user experience, creating ad-hoc widgets and screens based on the specific data or outputs it provides.

The DAF may operate by:

Breaking down pre-configured scaffolds into field-level components

Enabling AI to dynamically select and combine individual fields

Assembling unique widgets and landscapes based on specific interaction requirements The DAF addresses two critical limitations of traditional systems:

It overcomes rigid architectures by generating unique elements and landscapes on-the-fly, transcending the limitations of pre-configured components It handles unanticipated user needs through the creation of bespoke solutions tailored to specific scenarios Through this approach to dynamic assembly, the DAF represents a significant advancement in how AI systems can create and adapt user interfaces, moving beyond the constraints of traditional pre-configured components to deliver truly responsive and customized user experiences.

The system 200 may include a The Proactive Interactions Framework (PIF) 216, which enables background processes within the interaction matrix to anticipate and evolve forthcoming landscapes without requiring explicit user input. By continuously running these processes in the background, the system 200 may refine and adapt the matrix automatically, reducing the need for user-initiated inputs while enhancing the fluidity of the user journey.

The PIF 216 implements an automated background API that continuously feeds data to an AI agent. This agent reviews the user's journey "state" and identifies if any delta exists between the current state and the matrix landscape. When a delta is detected, the agent processes it as a secondary interaction; if no delta is found, the process continues monitoring.

The PIF 216's implementation may leverage an architecture in which initial delta processing is performed by a smaller AI model (e.g., 4o-mini) to control costs. When meaningful changes are detected, the processing may be forwarded to a more capable AI model for comprehensive handling.

For example, in an OS-level implementation, involving two invoked capabilities, Text and Slides:

- A user's text document containing the word "Dog" is continuously monitored
- The associated "Slides" feature automatically displays a "Dog" picture
- When the background API runs and finds no changes, no action is taken
- If the text changes to "Cat," the AI identifies the delta and automatically updates the "Slides" capability accordingly The PIF addresses several critical limitations of traditional systems:

- It elevates AI from a reactive to proactive resource, transforming transactional user-AI collaboration
- It enhances predictive capabilities by anticipating user needs through continuous background monitoring
- It overcomes static interaction models by enabling automatic evolution of landscapes without requiring explicit user input Through this approach to proactive interaction management, the PIF enables truly responsive and anticipatory system behavior that enhances the overall user experience while reducing manual intervention requirements.

The operation of the method 100 and system 200 will now be described in more detail. The system 200 may include a user 202, who may submit an input to the system 200 (FIG. 1, operation 102). The user 202 may or may not be a human. For example, the user 202 may be one or more human users, software applications, operating systems, software libraries, hardware devices, or any combination thereof. For example, the user 202 may be or include any one or more of the following: an operating system that submits inputs to process device-level commands, an application making requests to coordinate with other applications, or a software library accessing system capabilities. The user 202 may be hardware, such as any one or more of the following: an IoT device, extended reality (XR) device, wearable, smartphone, or any type of computer (e.g., a desktop, laptop, or tablet computer).

The method 100 supports a wide variety of input forms and modalities in step 102. For example, the system 200 may accepts multi-modal inputs that encompass any and all existing and future input types processable by AI models. The input received in step 102 may include, for example, any one or more of the following:

- Natural language commands, ranging from simple one-to-one inputs (e.g., "I ate a cheeseburger for lunch") to complex many-to-many inputs that span multiple distinct components requiring processing across separate capabilities (e.g., "I ate a cheeseburger for lunch and went for a 2 mile run")
- Hotkeys for common requests
- Photographs
- Audio
- Video
- Voice The input may be of any of the following types:

- Many-to-Many Inputs: Complex inputs that span multiple distinct components, each requiring processing and alignment with separate, potentially interrelated capabilities. These inputs involve multiple components that require outputs spanning multiple capabilities.
- User-Initiated and Non-User-Initiated Inputs: Inputs may originate either directly from user actions or be autonomously initiated through mechanisms such as the Proactive Interactions Framework 216.
- Dynamic Input Chaining: The system supports a recursive processing model where outputs from one capability can dynamically serve as inputs for subsequent interactions. For example, a device-level input like "Turn on the lights and play Christmas music" can generate outputs (light activation, music playback) that feed into additional interactions at the application level.

Input submission may occur through any modality, such as any one or more of the following: operating system, software application, web interface, or hardware device (e.g., smartphone, tablet computer, desktop computer, laptop computer, smartwatch, IoT device).

The system 200 may process such inputs regardless of whether they originate from a single source or multiple sources simultaneously, enabling both user-initiated and non-user-initiated inputs across different delivery modalities.

At this stage, the input represents the raw user submission before any additional processing or enhancement with contextual data and instructions occurs. As will be described in more detail below, this raw input will subsequently be processed by the Matrix Process Network 206 to create an interaction that includes the necessary contextual information and instructions for AI processing.

The Matrix Process Network 206 receives the submitted input and begins initial processing (FIG. 1, operation 104). The Matrix Process Network 206 functions as the central processing hub that receives inputs and transforms them into interactions—inputs that will be analyzed by AI for complex processing against capabilities.

When the user 202 submits an input (for example, "I ate a cheeseburger for lunch and went for a 2 mile run"), the system 200 activates the interaction matrix state. Each interaction includes not only the raw input, but also includes AI instruction sets, contextual data, and AI data structure. The AI instruction sets include instructions that follow defined prompt engineering schemas to ensure proper AI processing of all inputs. Such instruction sets may be unique across interactions and conditionally determined based on the user 202's context and interaction type. The contextual data provides supplementary data and context that supports the Core Processing Framework 204. The AI data structure provides a structured data schematics approach that creates a consistent, scalable, and consumable data model for the AI Interaction Matrix system 200. Like the instruction sets, the contextual data and AI data structure may be unique across interactions and conditionally determined based on the user 202's context and interaction type. These supplementary components enable the system 200 to maintain contextual continuity throughout the interaction.

The system 200 may be capable of processing three categories of interactions:

- Matrix Interactions: These are initiating interactions that generate an interaction matrix. The outputs from Matrix Interactions form the basis of the starting Matrix Landscape.
- Secondary Interactions: These occur after an interaction matrix has been established. Secondary Interactions are generally less complex as they primarily interact with existing elements or capabilities and benefit from the established matrix landscape context.
- Secondary Matrix Interactions (SMI): These are enhanced Secondary Interactions that support a much broader scope of influence. Unlike regular Secondary Interactions, SMIs are not bound to existing elements or capabilities. Instead, their processing architecture approaches that of a master interaction, providing opportunities to reshape the overall matrix landscape. SMIs support the Continuous Evolution Framework 214.

The "interaction matrix" is a unified, adaptive framework that orchestrates the end-to-end user experience by seamlessly integrating and coordinating various system components and capabilities, such as meal tracking and activity tracking. It serves as a dynamic container that unifies and orchestrates all interactions throughout the user experience, tracking which capabilities have been triggered and maintaining their states (invoked, active, or pending).

The "interaction matrix state" is like turning on a switch that enables key system components. While the interaction matrix exists as a conceptual framework, the interaction matrix state represents actual technical states in the system 200 that activate specific features and maintain contextual continuity. This state remains active during processing and user interactions until explicitly terminated, controlling what capabilities are available and how the system processes and displays information to the user throughout their interaction.

A "capability" refers to a distinct feature, functionality, application, AI agents or mechanism within the system 200 that is designed to serve a specific purpose or address a particular user or system need. A capability may be enhanced with tailored AI instructions that enable intelligent processing of inputs to align with the technology's features and objectives.

The system 200 may categorize capabilities into different states to support the processing of interaction matrices, such as any one or more of the following:

Invoked Capabilities: These are capabilities that have been invoked for a given interaction matrix Active Capability(ies): These represent the capability or capabilities that the user is actively interacting with at the given moment Pending Capabilities: These are invoked capabilities that have yet to be actively interacted with For example, when processing an input about lunch and running, different capabilities like meal tracking and activity tracking may be invoked, with their respective states managed by the system 200 throughout the interaction. The system 200 maintains awareness of these capability states to coordinate processing and ensure appropriate handling of user interactions across different features and functionalities.

An "element" refers to an individual component or mechanism used to deliver functionality within the system. Elements may take any of a variety of forms, including but not limited to: features, processes, data, applications, sub-applications, AI capabilities, functions, user interface components, content, actions, action flows, APIs, queries, states, inputs, and outputs.

Elements serve as the fundamental building blocks of landscapes within the system 200. When assembled together through the Matrix Landscape Builder 208, these elements form cohesive capability landscapes that deliver specific functionalities to users. For example, when processing an input about meals and activities, different elements such as UI components, data structures, and processing functions may be assembled to create the appropriate capability landscapes for both meal tracking and activity logging.

The system 200 manages elements through various frameworks and methodologies, particularly the Dynamic Assembly Framework 218, which can break down elements to field-level components for creating unique, ad-hoc widgets and interfaces based on specific interaction requirements. This granular approach to element management enables the system 200 to dynamically assemble and modify landscapes in response to changing user needs and interaction contexts.

A "landscape" refers to a cohesive grouping of elements that serve as the foundational constructs for delivering dynamic and adaptive experiences within the system. Landscapes support the Dynamic Generation Architecture 210 by providing structural "scaffolding" that can be dynamically assembled to support invoked capabilities. While landscapes may be pre-configured based on a technology's capabilities, the Dynamic Assembly Framework 218 enables AI to generate landscapes "on-the-fly," transcending the limitations of pre-configured components.

The system 200 may categorize landscapes into three distinct levels:

Capability Landscape: The collective set of elements used to deliver a single, specific capability. For example, when processing meal-related data, the capability landscape may include all UI components, data structures, and processing elements needed for meal tracking functionality.

Matrix Landscape: The collective set of elements used to deliver all invoked capabilities within an interaction matrix. This encompasses the combined elements needed to support multiple capabilities that have been invoked simultaneously, such as both meal tracking and activity logging.

Technology Landscape: The collective catalogue of all elements across all capabilities for a given technology. This represents the complete set of available elements that can be used to construct capability and matrix landscapes within the system.

The Dynamic Generation Architecture 210 leverages these landscape levels to orchestrate appropriate user experiences by assembling the necessary elements based on specific interaction requirements. Through the Dynamic Assembly Framework 218, landscapes can evolve beyond their pre-configured states, enabling the creation of unique, context-specific user experiences that adapt to changing user needs.

The Matrix Landscape Builder 208 is a master-level component that contains elements across multiple capabilities, functioning like a master template that contains all the UI components, data structures, technical functions, and processing elements needed for different capabilities. The MLB's elements may be conditionally and dynamically assembled, generated, and/or initiated to form the relevant landscapes per interaction requirements. For example, when processing an input about lunch and running, the landscape builder would contain the components and functionality needed to display and process both meal-related data and activity-related data.

With these terms defined, when an input is received, the system 200 activates the interaction matrix state, which initiates both the overarching interaction matrix framework that coordinates the entire process and the landscape builder component that provides the necessary UI components, data structures and technical functions for processing the input.

The Matrix Process Network 206 begins preparing the input for enhancement with appropriate instruction sets, contextual data, and AI data structure output definitions. During this initial reception phase, the system begins the task of identifying whether the input represents a matrix interaction (initial complex input), a secondary interaction (within an existing matrix), or a secondary matrix interaction (enhanced secondary interaction). This step serves as the entry point where raw user inputs are prepared for transformation into fully contextualized interactions that can be processed by the AI Core Processing Framework 204.

The Matrix Process Network 206 defines three critical components needed for processing the user's input (FIG. 1, operation 106). First, the Matrix Process Network 206 defines (e.g., selects and/or generates) an appropriate instruction set based on the user 202's input and context. The instruction set may follow defined input engineering schemas to ensure AI properly processes all inputs. These instructions are unique across interactions and conditionally determined based on details including the user's context and interaction type. The instruction sets follow a structured schema that includes:

Summary of AI Persona. The instruction set may include a Summary of AI Persona, which defines the AI's role, purpose, and areas of expertise within the supporting technology. This persona definition helps ensure consistent and reliable processing by providing the AI with clear guidelines about its role, expertise boundaries, and interaction style when processing user inputs.

Understanding of interactions, contextual data, and message history at a conceptual level. This may include, for example, the AI's broad understanding of how different types of interactions function within matrix frameworks generally, how contextual data provides supplementary information about users and their activities across different matrix instances, and how message and interaction histories relate to one another across matrix implementations.

Process instructions including capability overview, parsing, and output schema instructions. This may include, for example:

1. Capability Overview/Parsing: Instructions that help the AI understand and parse inputs against relevant capabilities. For example, when processing an input about meals and activities, these instructions guide how the AI identifies and separates different capabilities within the input.
2. Capability Processing Instructions: Specific instructions for how to process each identified capability. These instructions are tailored to the unique requirements of each capability type and guide how the AI processes the parsed information.
3. Output Schema Instructions: Guidelines for how the AI should structure its output for each processed capability to ensure the data can be properly handled by the system's dynamic generation architecture and landscape frame builder.

Quality control parameters. These may include a set of self-verification instructions that enable the AI to validate its own processing, such as any one or more of the following: (1) A Self-Verification Checklist that directs the AI to review and validate its outputs against defined criteria before returning results to the Matrix Process Network; (2) Error Handling protocols that specify how the AI should identify, process, and respond to potential errors or inconsistencies in its processing of inputs and generation of outputs; (3) Security Protocols that provide guidelines for detecting and appropriately handling potentially manipulative inputs, recognizing indicators of user distress in inputs, maintaining appropriate professional boundaries in interactions, and other protective measures to ensure safe and reliable processing. These quality control parameters work in conjunction with the AI Input Engineering methodology and instruction schemas to ensure reliable and consistent processing of inputs while maintaining appropriate operational safeguards.

Capability output consolidation requirements. This refers to instructions that guide how the AI should combine and consolidate outputs from multiple processed capabilities into a single cumulative output. When processing complex many-to-many inputs, the system 200 may generate specific outputs for each identified capability (such as meals and activities) and then uses these requirements to consolidate them into one comprehensive output.

Second, the Matrix Process Network 206 defines the contextual data that will accompany the input. This supplementary data provides additional context about the user 202 and their activities to help fill in gaps outside the specific interaction. The contextual data is uniquely determined for each interaction based on the user 202's context and interaction type. For example, when processing an input about meals and activities, the contextual data may include relevant information about the user 202's previous interactions, relevant data and preferences within these capabilities.

For example, when the user 202 submits an input (such as, "I ate a cheeseburger for lunch and went for a 2 mile run"), the Matrix Process Network 206 may dynamically generate contextual data specific to that interaction. This contextual data may include any one or more of the following:

User Context: Information about the user's current state and preferences within relevant capabilities. For example, when processing a meal input, the contextual data may include the user's meal history, nutritional targets and preferences, as well as other relevant meal-tracking information.

Interaction Context: Data about the current interaction matrix state and any active or pending capabilities. For instance, if the user 202 is in the middle of logging multiple meals and activities, the contextual data may maintain awareness of which capabilities are active and what actions have already been taken.

Historical Context: Information from previous interactions that helps maintain contextual continuity. This allows the system 200 to process follow-up interactions without requiring users to reestablish context. For example, if the user 202 says "make that two" after previously logging one banana, the contextual data enables the system 200 to understand which item is being modified without specifically mentioning it (one banana to two).

The contextual data may not be selected from a pre-existing set, but rather may be dynamically generated based on any one or more of the following:

The type of interaction (matrix, secondary, or secondary matrix)

The capabilities involved in the interaction

The current state of the interaction matrix

The user's previous interactions and preferences within relevant capabilities

This contextual data works in conjunction with the instruction sets and AI data structures to ensure the AI can continuously maintain contextual awareness throughout the overall interaction experience.

Third, the Matrix Process Network 206 defines the AI data structure, which establishes how the processed information will be formatted and organized. The AI data structure is specifically designed to ensure reliable processing and consumption within the target technology and to enable the dynamic generation of landscapes and maintain persistent data across interactions. Each AI data structures is capability-specific, meaning they are tailored to properly handle different types of outputs (such as meal data versus activity data) across a technology's capabilities while maintaining a standardized schema that allows for proper parsing and processing.

This step is particularly useful as it transforms a raw user input into a fully contextualized interaction that contains all the necessary components for proper AI processing. The defined instruction sets, contextual data, and output structures work together to ensure the system can maintain contextual continuity and properly process both simple one-to-one inputs and complex many-to-many interactions.

Any or all of these components may be enhanced via Dynamic AI Expertise, which uses a two-stage method to first analyze an input in order to dynamically craft tailored instructions, areas of expertise, and/or context. These tailored components are then used to supplement the enriched data package provided by the Matrix Process Network 206 for subsequent processing. This method ensures every user input is processed by an AI expert in the relevant subject matter.

The Matrix Process Network 206 transmits the enriched data package to the AI as part of the AI Core Processing Framework 204 (FIG. 1, operation 108). This data package includes the original user input, the dynamically generated instruction set, contextual data, and AI data structure definitions that were prepared in the previous step.

This step may, for example, involve transmitting the data to a first AI agent that specializes in identifying capabilities, followed by transmission to a second (or more) AI agent(s) that handles the complex processing. This split processing approach enables more efficient handling of instructions by allowing each AI agent to work with more specialized, targeted instruction sets (Model 2).

This transmission step represents a handoff between the Matrix Process Network 206's preparation phase and the actual AI processing phase within the AI Core Processing Framework 204. The enriched data package enables the AI to process both simple one-to-one inputs and complex many-to-many inputs while maintaining proper context and capability-specific processing requirements.

The AI within the AI Core Processing Framework 204 processes the enriched data package received from the Matrix Process Network 206 to generate output, and transmits the output back to the Matrix Process Network 206 (FIG. 1, operation 110). As part of this processing, the AI Core Processing Framework 204 executes a series of processing steps guided by the instruction set schema.

First, the AI Core Processing Framework 204 analyzes the input to identify which capabilities have been invoked. For example, when processing an input containing both meal and activity information, the AI Core Processing Framework 204 determines that both the meal tracking and activity tracking capabilities are involved. For each identified capability, the AI Core Processing Framework 204 then:

Performs initial processing

Determines if additional functions (such as database queries or APIs) are required for continued processing Performs any required additional functions and associated processing Generates specific output for that capability according to the defined output schema Once the AI Core Processing Framework 204 has processed all identified capabilities individually, it consolidates the separate capability outputs into a cumulative output following the capability output consolidation requirements provided in the instruction set. This consolidated output adheres to the defined AI data structure specifications that were included in the original data package. Such processing may, for example, be split between two specialized AI agents—the first identifies capabilities while the second handles the complex processing of those identified capabilities, enabling more efficient instruction handling.

After processing is complete, the AI Core Processing Framework 204 transmits the structured output data back to the Matrix Process Network 206. This output contains all processed capability data formatted according to the defined schemas, enabling proper parsing and handling by subsequent system components.

The Matrix Process Network 206 receives, parses, processes, and maintains the AI output data that was generated in the previous step (FIG. 1, operation 112). The Matrix Process Network 206 first identifies which capabilities were invoked from the AI output. For example, if the original input contained both meal and activity information, the Matrix Process Network 206 identifies these as separate invoked capabilities that need to be processed.

The Matrix Process Network 206 then assigns the identified capabilities to different states. Two primary states are established: the invoked capabilities state and the pending capabilities state. Initially, these states contain the same capabilities—for example, if meals and activities were processed, both would appear in both the invoked and pending states.

The Matrix Process Network 206 then uses the invoked capabilities to parse and process the AI outputs. For each capability identified in the invoked capabilities state, the Matrix Process Network 206 parses the corresponding output data from the AI's consolidated output and stores it in its own unique output state. For instance, the meals output may be parsed and stored in a meals output state, while the activity output may be parsed and stored in an activity output state.

This parsing and state management approach enables the system's Persistence Methodology, allowing auxiliary content to be preserved until user engagement. The separate output states for each capability ensure that data remains persistent and accessible even as users interact with different capabilities throughout their session.

The parsed and processed outputs are maintained in these capability-specific output states, which will later be used to populate the appropriate landscapes when users interact with each capability. This state-based maintenance of outputs supports the system's ability to maintain contextual continuity and enable seamless transitions between different capabilities.

The Dynamic Generation Architecture 210 leverages the parsed and processed output data maintained in the Matrix Process Network 206 states to orchestrate the unified and dynamic end-to-end user experience. It does so through the Matrix Landscape Builder 208, which dynamically assembles and presents landscapes for user interaction while ensuring seamless, ongoing access to AI (FIG. 1, operation 114). For example, the Dynamic Generation Architecture 210 may access the capability-specific output states that were established in the previous step. Using these states, it may begin the process of dynamically assembling and generating landscapes within the Matrix Landscape Builder 208 based on which capabilities were invoked.

The landscape generation process involves assembling elements within the Matrix Landscape Builder 208, which serves as a master template containing UI components, data structures, technical functions, and processing elements needed for different capabilities. For each capability in the invoked capabilities state, the Matrix Landscape Builder 208 assembles the appropriate capability landscape using pre-configured scaffolding specific to that capability and context. For example, when processing an input containing both meal and activity data, the Dynamic Generation Architecture 210 may:

- Access the meals output state and activity output state
- Direct the Matrix Landscape Builder 208 to retrieve the appropriate UI components and data structures for each capability
- Direct the Matrix Landscape Builder 208 to populate these components with the corresponding output data
- Direct the Matrix Landscape Builder 208 assembly into capability-specific landscapes The generated landscapes serve as foundational constructs that enable seamless integration, scalability, and alignment with diverse user needs and technological capabilities. These landscapes may exist at any one or more of three levels:

- Capability Landscape: The set of elements for a single capability
- Matrix Landscape: The collective elements for all invoked capabilities
- Technology Landscape: The complete catalog of elements across all capabilities The Dynamic Generation Architecture 210 and Matrix Landscape Builder 208 continue this dynamic generation process until landscapes have been created for all invoked capabilities, creating a cohesive matrix landscape that will enable user interaction with the processed data.

The user 202 interacts with the dynamically generated landscapes created by the Matrix Landscape Builder 208 (FIG. 1, operation 116). The user can engage with different capabilities based on their states within the system.

Through its orchestration of dynamically generated graphical and technical landscapes, the system 200 may create a cohesive, unified experience for users across multiple capabilities. When interacting with these integrated landscapes, users have the ability to submit secondary interactions within the active capability(ies). For example, if a user initially logged one banana and wants to modify it to two bananas, they can submit this change as a secondary interaction within the meals capability landscape.

The system maintains contextual continuity throughout these interactions, allowing users to reference and modify previously entered information without needing to reestablish context. For instance, when a user says "make that two bananas," the system 200 understands which item is being modified based on the maintained contextual data.

As users interact with each capability landscape, the system 200 updates the pending capabilities state. When a user completes their interaction with one capability (such as finishing their meal entries), that capability is removed from the pending capabilities state. The system 200 then moves to the next pending capability, presenting the appropriate landscape for that capability.

The interaction process continues until the user has engaged with all pending capabilities or explicitly terminates the matrix (FIG. 1, operation 120). Throughout this process, the system 200 maintains persistent data states, allowing users to navigate between capabilities while preserving all entered information within the cohesive matrix landscape.

In the embodiment just described, the system 200 and method 100 process capabilities in a structured sequence. However, in other embodiments, the user 202 may navigate between capabilities in any of a variety of ways, e.g.:

- Predefined Order: Users can establish their preferred processing sequences in advance for a structured experience
- Simultaneous Activation: Multiple capabilities can function concurrently, enabling users to work across different capabilities in parallel
- On-Demand Selection: Users can dynamically select and switch between single or multiple capabilities at will, providing an open, exploratory experience where users choose their own navigation path through the capabilities The system 200 determines whether the user 202 has engaged in a secondary interaction within the active capability landscape (FIG. 1, operation 116). A secondary interaction occurs when the user 202 submits modifications or updates within an existing matrix—for example, when a user modifies a previously logged meal entry from one banana to two bananas.

If the system 200 determines that the user 202 has engaged in a secondary interaction, the method 100 returns to step 102 to process this new interaction. However, since this is a secondary interaction rather than an initial master interaction, the processing occurs within the context of the existing interaction matrix. The secondary interaction follows the same processing steps as the initial interaction (i.e., operations 102-116). For example, if the user 202 modifies a meal entry from one banana to two bananas, the system 200 may process this secondary interaction while maintaining awareness of the existing context, update the appropriate capability output state, and adapt the landscape to reflect the modified data. This enables continuous evolution of landscapes and the interaction matrix while maintaining contextual continuity throughout the user experience.

The method 100 enables seamless processing of user inputs through a sophisticated AI-driven architecture. When a user submits an input (step 102), the Matrix Process Network 206 receives it (step 104) and activates the interaction matrix state, initiating both the interaction matrix framework and Matrix Landscape Builder (208). The Matrix Process Network 206 then defines appropriate instruction sets, contextual data, and AI data structures (step 106) before submitting this enriched data package to the AI Core Processing Framework 204 (step 108). The AI processes the input according to defined schemas, generating capability-specific outputs that are consolidated and returned to the Matrix Process Network 206 (step 110). The Matrix Process Network 206 then parses and maintains these outputs in capability-specific states (step 112), which the Dynamic Generation Architecture 210 and Matrix Landscape Builder 208 leverage to generate dynamic landscapes and a cohesive user experience for each invoked capability (step 114). The user 202 may then interact with these landscapes (step 116), maintaining contextual continuity throughout their session. If the user 202 engages in a secondary interaction (step 118), such as modifying previously entered information, the method 100 returns to step 102 to process this new interaction within the context of the existing matrix. This cyclical process delivers a unified and interactive end-to-end user experience, leveraging AI to process complex inputs across multiple capabilities. The dynamic generation of graphical and technical landscapes, shapes a continuously evolving end-to-end user experience while preserving context and persistent data every step of the way.

As a particular illustration of how the method 100 would apply to a particular input from the user 202, consider the input: "I ate a cheeseburger for lunch and went for a 2 mile run":

Step 102 (Input Submitted): The user 202 submits the natural language input containing two distinct components—a meal entry and an activity entry. This represents a complex many-to-many input that will require processing across multiple capabilities.

Step 104 (Input Received): The Matrix Process Network 206 receives the input and activates the interaction matrix state, which initiates both the interaction matrix framework and Matrix Landscape Builder 208. The system 200 recognizes this as a matrix interaction that will require processing across multiple capabilities.

Step 106 (Define Instructions/Data): The Matrix Process Network 206 generates:
- Instruction sets for processing, including both meal and activity capabilities
- Contextual data about the user's meal, activity history, and other related data
- AI data structures including meal and activity data handling Step 108 (Submit to AI): The enriched data package is transmitted to the AI Core Processing Framework 204.

Step 110 (AI Processing): The AI Core Processing Framework 204:
- Identifies two distinct capabilities (meals and activities)
- Processes the cheeseburger lunch entry for the meals capability
- Processes the 2-mile run entry for the activity capability
- Consolidates processed outputs into a cumulative structured output for return Step 112 (Parse/Process Output): The Matrix Process Network 206:
- Identifies meals and activities as invoked capabilities
- Adds both to the invoked capabilities state and pending capabilities state
- Parses the meal data into a meals output state
- Parses the activity data into an activity output state Step 114 (Generate Landscapes): The Dynamic Generation Architecture 210 orchestrates and Matrix Landscape Builder 208 generates:
- A meal capability landscape for the cheeseburger entry
- An activity capability landscape for the run entry
- Assembles these into a cohesive matrix landscape and user experience Step 116 (User Interaction): The user 202 may interact with either capability landscape, starting with meals (if using the structured sequence approach). They can verify or modify the cheeseburger entry, then move on to verify or modify the run entry.

Step 118 (Secondary Interaction Check): If the user 200 makes any modifications (like updating the run distance), the system 200 identifies this as a secondary interaction and returns to step 102 to process the modification and landscape impacts within the context of the existing matrix.

The following is a description of an example implementation of the AIM system 200 in a wellness software application. In this example, implementation, the system 200 processes a complex many-to-many input in which the user 202 provides information about multiple meals, activities, metrics, and requests a recipe, e.g.: "Been so busy I keep forgetting to log my items! Yesterday I had General Tso's Chicken for dinner. Today I had a bagel with cream cheese for breakfast and 3 slices of pizza for lunch. I also got in a 3 mile run after lunch. I took my weight this morning and I lost 2 lbs! Lastly, I need a healthy recipe for dinner tonight, can you provide a simple Italian recipe, preferably something with chicken."

When this input is received, the Matrix Process Network 206 activates the interaction matrix state and identifies this as a matrix interaction that spans multiple capabilities: Meals, Activity, My Metrics, and Chat. The Dynamic Generation Architecture 210 orchestrates a cohesive end-to-end matrix landscape that presents these capabilities in sequence: Meals→Activity→My Metrics→Chat. For each capability, the Matrix Landscape Builder 208 assembles appropriate capability landscapes using pre-configured scaffolds that include necessary UI components, data structures, and processing elements.

Within the Meals capability landscape, the system 200 may display:
- Information about each logged meal
- Action buttons (Save, Resubmit, Decline) for each meal entry
- AI-generated textual feedback about recent meals The Continuous Evolution Framework 214 enables secondary interactions in response to the user 202 selecting "Resubmit" for any particular meal. Such secondary interactions may be less complex than the initial matrix interaction, as they primarily interact with existing elements and benefit from the established matrix landscape context. In response to the user 202 providing feedback to modify a meal, the system 200 may process this as a secondary interaction, maintaining contextual continuity without requiring the user 202 to reestablish context about which meal is being modified. Changes from secondary interactions dynamically adapt the capability and/or matrix landscapes, enabling real-time evolution of the user experience.

In response to the user 202 completing its interaction with each capability and pressing "Continue," the system 200 may update the pending capability state and transition to the next capability in sequence—from Meals to Activity to My Metrics and finally to Chat. This sequential progression demonstrates the system 200's ability to maintain persistent states while coordinating multiple capabilities within a single interaction matrix. Throughout this interaction flow, the Contextual Continuity Methodology ensures the AI maintains awareness of the user 202's "location" within the matrix, enabling seamless transitions between capabilities while preserving all entered information. The Matrix Process Network 206 and Dynamic Generation Architecture 210 orchestrate the entire experience, ensuring that each capability's data remains persistent and accessible throughout the interaction sequence.

This implementation showcases how the system 200 processes complex many-to-many inputs while maintaining contextual awareness and enabling fluid interaction across multiple capabilities through dynamically generated, contextually appropriate landscapes.

The following is a description of an example implementation of the AIM system 200 at the operating system (OS) level. In this example, the system 200 processes a complex many-to-many input where a student initiates a research project workflow: "Hi Enzo, Professor Brown just assigned a research project on the Jazz Age that's due next Friday. I'd love to focus this project on key personalities that helped shape the movement . . . "

When this input is received, the Matrix Process Network 206 activates the interaction matrix state and identifies this as a matrix interaction that spans multiple cross-application capabilities: document processing (outline), presentation software (slides), media applications (playlist), e-commerce (book ordering), and calendar management. The Dynamic Generation Architecture 210 orchestrates a cohesive matrix landscape that coordinates these capabilities across multiple applications and devices simultaneously through the Capability Assignment Framework.

The Proactive Interactions Framework 216 implements continuous monitoring and evolution through:

- An automated background API that monitors the outline document
- AI agents that detect content changes (using smaller models for efficiency)
- Automatic propagation of updates to related capabilities (like slide generation)
- Processing of detected changes through more capable AI models when needed The system 200 leverages Dynamic Input Chaining for recursive processing, where outputs from one capability become inputs for others:

- Key figures identified in the outline become inputs for slide creation
- Those same figures inform playlist generation parameters
- The identified topics guide book recommendations
- Calendar entries are created based on project timeline requirements Throughout this process, the Contextual Continuity Methodology ensures the AI maintains awareness of the broader project context across all applications and devices. For example, when updating slides based on outline changes, the system 200 understands the relationship between the modified content and existing visualizations without requiring explicit user direction.

The Matrix Process Network 206 manages this complex cross-application experience by:

- Maintaining persistent states across all involved applications
- Coordinating data flow between different capabilities
- Ensuring contextual continuity across application boundaries
- Managing proactive updates and recursive processing chains This implementation demonstrates how the system 200 can coordinate sophisticated workflows across multiple applications and devices while maintaining contextual awareness and enabling automated evolution of content across different capabilities. The combination of simultaneous capability activation, proactive monitoring, and dynamic input chaining enables a truly integrated cross-application experience that adapts to user needs in real-time.

The following is a description of an example implementation of the AIM system 200 within the context of an enterprise software application. In this implementation, the system 200 processes a complex many-to-many input where a recruiting manager initiates multiple HR workflows: "Busy day ahead, couple things we need to accomplish. The VP of Accounting just checked in for a status update on her group's open positions, let's review all new candidates for Job Reqs in her group . . . "

When this input is received, the Matrix Process Network 206 activates the interaction matrix state and identifies this as a matrix interaction spanning multiple HR capabilities: candidate review, phone screen management, and performance review drafting. The system processes this through Model 2 architecture, using an initial Capability Identification AI to analyze the input and dynamically craft additional supporting instructions and data, which are then passed to a specialized Capability Processing AI.

The Dynamic Generation Architecture 210 orchestrates, and the Matrix Landscape Builder 208 generates a cohesive matrix landscape that coordinates these capabilities through both Simultaneous Activation and On-Demand Selection. The Capability Assignment Framework enables users to either process multiple capabilities in parallel or directly select which capability to interact with through interface elements.

The Dynamic Assembly Framework 218 generates unique interface elements tailored to each capability's requirements:

- Custom candidate review interfaces for accounting positions
- Phone screen management workflows for the Admin role
- AI-guided performance review templates with contextual suggestions The Proactive Interactions Framework 216 implements continuous monitoring through:

- Background processes tracking candidate status changes
- Automatic updates when new applications match requirements
- Dynamic updates to performance review drafts as new check-in notes are added Throughout this process, the Contextual Continuity Methodology ensures the AI maintains awareness of:

- Specific accounting group positions requiring review
- Candidates at the phone screen stage for the Admin role
- Relevant check-in notes for performance review drafting The Matrix Process Network 206 orchestrates this complex HR experience by:

- Maintaining persistent states across all capabilities
- Coordinating data flow between different HR functions
- Ensuring contextual continuity across different review processes
- Managing proactive updates and dynamic interface generation This implementation demonstrates how the system 200 can coordinate sophisticated HR workflows while maintaining contextual awareness and enabling automated evolution of content across different capabilities. The combination of dynamic expertise, flexible capability assignment, and proactive monitoring enables an efficient workflow that adapts to the recruiting manager's needs in real-time.

The systems, methods, and architectures described above in the preceding sections represent specific implementations within a broader class of AI-driven platform architectures implemented according to embodiments of the present invention. The following describes generalized embodiments of the present invention that encompass both the specifically described implementations above as well as alternative implementations offering increased flexibility and broader applicability.

In certain embodiments, the AI Interaction Matrix system may be implemented with varying degrees of defined versus dynamic components along a spectrum of implementation approaches. At one end of the spectrum, components may be fully pre-defined with static structural parameters as described in the preceding sections. At the opposite end of the spectrum, components may be fully dynamic with structures, properties, and behaviors generated on-demand in response to user inputs and requirements. Between these endpoints, hybrid implementations may combine defined and dynamic components according to application-specific requirements, enabling the system to adapt to varying degrees of customization and flexibility based on specific use case needs.

Referring to FIG. 2, the generalized architecture enables creation of AI-first platforms that dynamically orchestrate workflows, interfaces, and data structures across one or more functional domains. Unlike traditional applications with static interfaces and rigid data models, the generalized architecture supports this spectrum of implementation approaches from fully pre-defined to fully dynamic. The core principle underlying this architecture positions AI as centralized infrastructure that coordinates "organizing units" (functional containers) which may be either pre-defined or dynamically created based on user needs.

All embodiments may implement a foundational four-layer architecture that has been extended to include an agentic layer. The system 200 includes a matrix process network 206 that operates as an orchestrating "nervous system" receiving inputs and coordinating system components while maintaining persistent state throughout interactions and managing data flow between all system layers. An AI core processing framework 204 functions as a processing "brain" that interprets inputs and generates structured outputs, operating according to instruction sets and contextual data to produce outputs aligned with technological capabilities. A dynamic generation architecture 210 serves as an orchestration "stage" translating AI outputs into user experiences by assembling interface components, workflows, and data displays while coordinating presentation of processed information. A matrix landscape builder 208 functions as a master component assembling cohesive experiences by managing component libraries and generating unified interfaces from individual elements. This foundational architecture remains consistent whether organizing units are pre-defined capabilities with static parameters or dynamically created structures with flexible properties.

The system 200 may further include an agentic layer that operates as an extension of the matrix process network 206 to enable proactive background processing and autonomous workflow evolution. This agentic layer may operate independently of direct user interaction, enabling proactive background processing that anticipates user needs and evolves workflows autonomously. For example, the agentic layer may continuously monitor user data states and automatically trigger updates to interface components or suggest new workflow configurations based on detected patterns or changes in user behavior.

The generalized architecture normalizes system components into two categories: technical components and process components. The technical components define the structural and data elements of the system and may include matrix structures that provide overall organizing frameworks, organizing units that function as functional containers, objects that serve as data storage structures, an AIM catalog containing available actions and operations, AI instruction sets providing guidance for AI processing, contextual data supplying supplementary information for processing, AI output schemas defining structure definitions for AI-generated data, and AI UX components comprising interface elements for user interaction. The process components define the operational flow of the system and may include initiation for receiving and preparing user inputs, detection for identifying relevant organizing units, pre-processing for enriching inputs with context and instructions, processing for AI interpretation and output generation, transformation for converting AI outputs to executable operations, agentics/third-parties for background and external processing, AI UX for interface generation and presentation, and process/logic for workflow execution and state management.

With continued reference to FIG. 2, the AI core processing framework 204 may be implemented using Model 1 with a single central AI agent or Model 2 with multiple specialized AI agents. In Model 1 implementations, processing may be consolidated into a single, central AI agent that operates using a robust instruction set provided by the matrix process network 206 to manage all possible technological capabilities. In Model 2 implementations, a two-stage processing approach may employ multiple specialized AI agents including a detection AI and a processing AI. The detection AI may analyze inputs, identify invoked capabilities, and generate supporting data such as dynamic AI expertise to enrich and tailor the matrix process network 206 instructions and context data. The processing AI may then leverage the enriched package to process inputs against identified technological capabilities, producing final outputs.

Organizing units may exist along a spectrum from fully defined to fully dynamic implementations. At the defined end, organizing units may comprise pre-configured capabilities with static structural parameters including fixed data schemas, pre-built interface components, predefined processing instructions, predefined processes, and established relationships with other capabilities. These defined organizing units may enable rapid deployment for known use cases, provide consistent user experience, deliver predictable system behavior, and are suitable for regulated environments such as enterprise, healthcare, and finance applications. At the dynamic end, organizing units may comprise master objects created on-demand in response to user inputs. These dynamic organizing units may include structures with parameters generated during processing, such as AI-generated data schemas, dynamically assembled interface components, context-derived processing instructions, and/or relationships established during creation. Dynamic organizing units may enable flexible adaptation to novel use cases, provide evolving user experiences, support emergent system behaviors, and are suitable for consumer applications with diverse needs.

The implementation spectrum may allow for positioning at any point between fully defined and fully dynamic approaches. At one end of the spectrum, all organizing units may be capabilities with complete pre-configuration. In hybrid implementations, core organizing units may be capabilities while supplementary organizing units may be master objects created as needed. At the opposite end of the spectrum, all organizing units may be master objects generated on-demand. This spectrum concept may enable implementations to be tailored to specific application requirements while maintaining the consistent foundational architecture.

Figure 4:
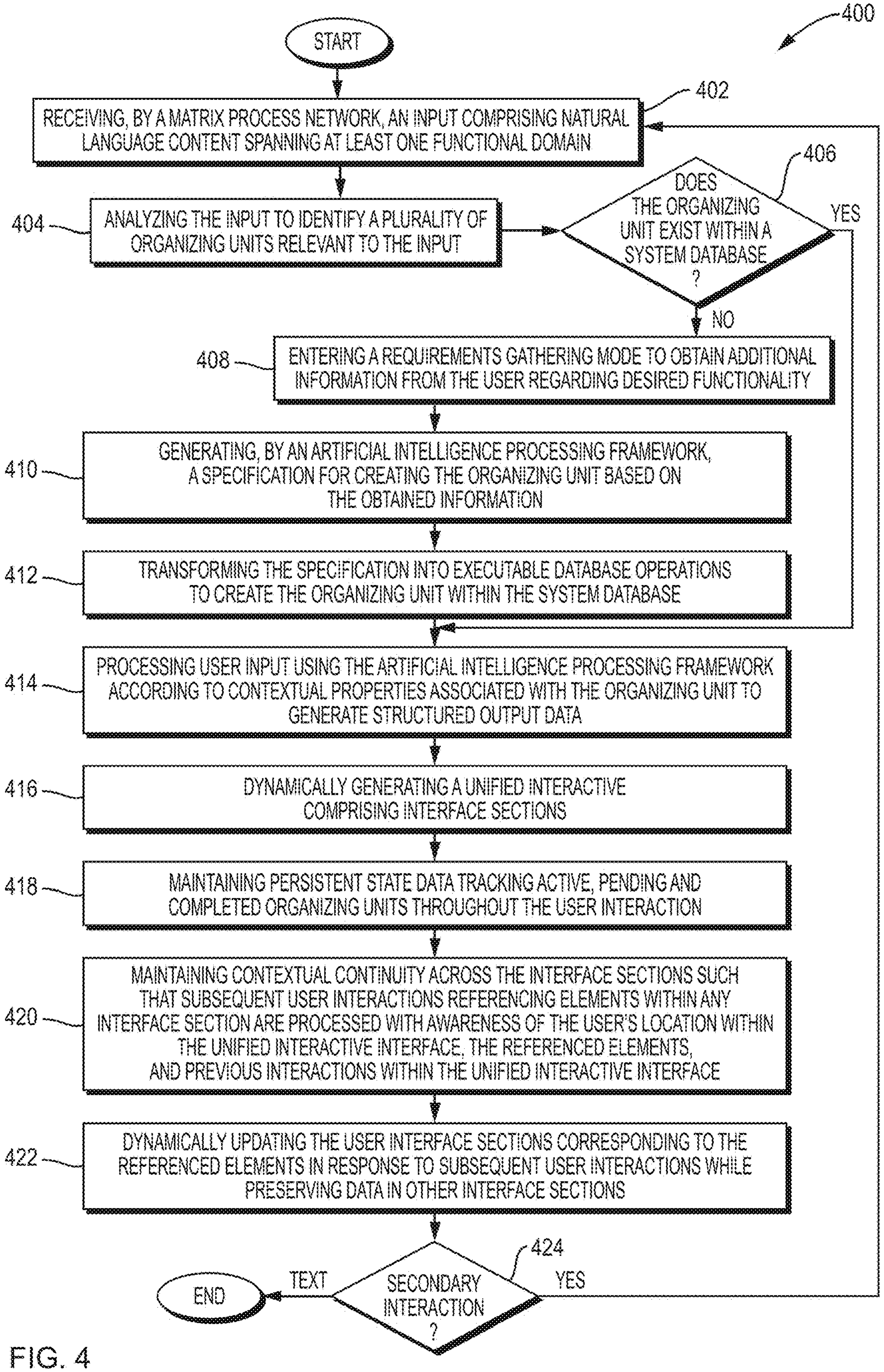
FIG. 4 illustrates a flowchart for a method 400 for dynamically processing complex user interactions through artificial intelligence according to one embodiment of the present invention.

Referring to FIG. 4, a method 400 demonstrates the adaptive approach to handling both existing and newly created organizing units. The method 400 begins at step 402 where a matrix process network receives an input comprising natural language content spanning at least one functional domain. At step 404, the input may be analyzed to identify a plurality of organizing units relevant to the user input, with each organizing unit corresponding to a distinct functional domain. The method 400 may include a decision point at step 406 to determine whether organizing units exist within a system database, enabling dynamic creation of functional domains based on user requirements while maintaining consistent processing workflows for structured output generation.

The implementations described in the preceding sections represent a valid embodiment of this generalized framework, positioned toward the defined end of the spectrum with pre-configured capabilities, static data structures, and pre-built interface components. However, the generalized framework enables applications beyond those described above, extending to fully dynamic implementations where all components are generated on-demand based on user requirements and contextual information gathered through conversational interfaces.

Referring to FIG. 4, the following provides a detailed walkthrough of method 400 for dynamically processing complex user interactions through artificial intelligence according to one embodiment of the present invention. The method 400 demonstrates how certain embodiments of the system 200 (FIG. 2) process inputs spanning one or more functional domains while supporting both pre-defined capabilities and dynamically-created organizing units.

At step 402, the method 400 begins when the Matrix Process Network 206 (FIG. 2) receives an input comprising natural language content spanning at least one functional domain. The input may be received from any of a variety of sources. For example, the input may be received from the user 202 (FIG. 2) through a user interface, such as a web interface, mobile application interface, desktop application interface, or voice interface. The input may be received from one or more software applications through application programming interfaces (APIs), enabling programmatic interaction with the system 200. For example, a customer relationship management application may submit inputs to the system 200 via an API to process customer data across multiple organizing units, or a project management application may submit inputs to coordinate tasks and resources across different functional domains. The input may be received from an operating system, one or more hardware devices such as IoT devices or wearables, or one or more automated processes such as scheduled tasks or event-triggered workflows.

The input may comprise simple one-to-one natural language commands or complex many-to-many inputs that span multiple distinct components requiring processing across separate functional domains. For example, in the enterprise application context illustrated in FIG. 3, the input may comprise a recruiting manager's request to review candidates, schedule phone screens, and draft performance reviews. The Matrix Process Network 206 receives this raw input and prepares it for subsequent processing by the system 200.

At step 404, the method 400 analyzes the input to identify a plurality of organizing units relevant to the input. Each organizing unit may correspond to a distinct functional domain. As this implies, if there are multiple distinct functional domains, then each organizing unit may correspond to a distinct one of the multiple distinct functional domains. The organizing units may comprise pre-defined capabilities with static structural parameters, as described in the preceding sections, or may comprise dynamically-created master objects generated on-demand based on user requirements. The analysis at step 404 may be performed by the AI Core Processing Framework 204 (FIG. 2) using detection criteria stored as metadata. For example, the system 200 may execute a detection agent to compare the user input against activation phrases and input hints associated with each organizing unit. In the enterprise application example shown in FIG. 3, the analysis may identify organizing units corresponding to candidate review, candidate screening, and performance review capabilities based on the content of the recruiting manager's input.

As described above, the analysis at step 404 parses the input to identify functional components within the natural language content. For example, an input such as "I ate a cheeseburger for lunch and went for a 2 mile run" may be parsed to identify two functional components: meal-related content and activity-related content. The method 400 then proceeds to a decision point at step 406, which determines whether organizing units exist within a system database that relate to the identified functional components. This determination may involve querying the database to check for the presence of data structures, contextual properties, and interface component definitions associated with organizing units capable of handling the functional components. The relationship between functional components and organizing units may or may not be one-to-one. For example, multiple functional components such as meals and activities may map to a single organizing unit (e.g., a "Wellness" organizing unit that encompasses both meal tracking and activity tracking), or each functional component may correspond to its own distinct organizing unit. If one or more organizing units exist within the system database that can handle the identified functional components (Yes branch from step 406), the method 400 proceeds directly to step 414 to process the input using those existing organizing units. However, if no organizing unit exists within the system database to handle one or more of the identified functional components (No branch from step 406), the method 400 proceeds to step 408 to create the organizing unit dynamically.

At step 408, the system 200 enters a requirements gathering mode to obtain additional information from the user 202 regarding desired functionality. This requirements gathering mode may involve the Matrix Process Network 206 initiating a conversational interface through which the AI Core Processing Framework 204 engages with the user 202 to understand the specific requirements for the new organizing unit. The requirements gathering may include questions about what types of data should be tracked, what operations should be supported, how the organizing unit should interact with other organizing units, and what interface elements should be presented to users. For example, if a user requests functionality for tracking a novel type of business metric not previously supported by the system 200, the requirements gathering mode may ask questions about the metric's data structure, calculation methods, visualization preferences, and relationships to existing capabilities.

At step 410, the AI Core Processing Framework 204 generates a specification for creating the organizing unit based on the obtained information. The specification may comprise three components: (i) a data structure schema defining storage structures for data associated with the organizing unit, (ii) contextual properties defining processing instructions for future interactions with the organizing unit, and (iii) interface component definitions for user interaction with the organizing unit. The data structure schema may define database tables, fields, data types, relationships, and constraints needed to store data for the organizing unit. The contextual properties may include AI instruction sets that guide how future inputs related to this organizing unit should be processed, detection criteria that enable the system 200 to identify when the organizing unit is relevant to user inputs, and processing rules that define how data should be validated and transformed. The interface component definitions may specify UI components, layouts, actions, and visual elements that enable users to interact with the organizing unit through the Matrix Landscape Builder 208 (FIG. 2).

At step 412, the method 400 transforms the specification into executable database operations to create the organizing unit within the system database. This transformation may involve generating data definition language statements to create new database tables and relationships, or may involve creating logical schema changes using metadata-driven virtual schemas without modifying underlying database structures. The transformation process may also include registering the organizing unit's contextual properties with the Matrix Process Network 206, storing the interface component definitions for use by the Dynamic Generation Architecture 210 (FIG. 2), and establishing any necessary relationships between objects, such as between the new organizing unit and existing organizing units. Once the database operations are executed, the newly created organizing unit becomes available for processing inputs and generating landscapes, just like pre-defined capabilities.

Some embodiments of the method 400 may omit some or all of steps 406-412. For example, in embodiments where the system 200 implements static capabilities with pre-defined organizing units, the decision point at step 406 and the subsequent steps 408, 410, and 412 for dynamic organizing unit creation may not be performed. In such embodiments, the method 400 may proceed directly from step 404 to step 414, as all organizing units identified during the analysis at step 404 may already exist within the system database as pre-configured capabilities. This streamlined processing path may be suitable for implementations positioned toward the defined end of the spectrum, such as enterprise applications with established functional domains, healthcare systems with regulatory compliance requirements, or financial applications with predetermined data structures and workflows.

At step 414, the method 400 processes the input using the AI Core Processing Framework 204 according to contextual properties associated with each identified organizing unit to generate structured output data. This processing may occur for both pre-existing organizing units (reached via the Yes branch from step 406) and newly created organizing units (reached after completing steps 408-412). The AI Core Processing Framework 204 may leverage AI instruction sets, contextual data, and AI data structures associated with each organizing unit to process the relevant portions of the input. For example, in the enterprise application context shown in FIG. 3, the AI Core Processing Framework 204 may process candidate review data according to the contextual properties of the candidate review organizing unit, process phone screen data according to the contextual properties of the candidate screen organizing unit, and process performance review data according to the contextual properties of the performance review organizing unit. The processing at step 414 may follow the AI Input Engineering methodology described in the preceding sections, combining user inputs with matrix-based guidance including instruction sets optimized for technology capabilities and contextual data tailored to the user's journey.

At step 416, the method 400 dynamically generates a unified interactive interface comprising interface sections that may, for example, correspond to each identified organizing unit. Each interface section may be populated with the structured output data and assembled according to the interface component definitions. This dynamic generation may be orchestrated by the Dynamic Generation Architecture 210 and implemented through the Matrix Landscape Builder 208 (FIG. 2). The Matrix Landscape Builder 208 may retrieve the appropriate UI components, data structures, technical functions, and processing elements for each organizing unit, populate these components with the corresponding structured output data generated at step 414, and assemble them into a unified interactive interface. For example, as shown in FIG. 3, the unified interactive interface may include a Candidate Review Landscape displaying candidate information in a table format, a Candidate Screen Landscape providing screening functionality, and a Messaging Landscape enabling communication. The interface sections may be assembled using pre-configured scaffolds for pre-defined capabilities or may be dynamically assembled using the Dynamic Assembly Framework 218 (FIG. 2) for organizing units created on-demand. The unified interactive interface may support multiple capability sequencing options through the Capability Assignment Framework, including predefined order, simultaneous activation, and on-demand selection as illustrated in FIG. 3.

In some embodiments, the method 400 may include step 418, where the method 400 maintains persistent state data to track active, pending, and completed organizing units throughout the user interaction. Some embodiments may omit step 418, implementing simplified state management that does not track active, pending, and completed organizing units separately. In embodiments that include step 418, the Matrix Process Network 206 may establish and manage distinct states including an invoked state identifying all organizing units that have been invoked for the current interaction matrix, an active state identifying the organizing unit or units that the user 202 is actively interacting with at the given moment, and/or a pending state identifying invoked organizing units that have yet to be actively interacted with. The persistent state data may include capability-specific output states that store the structured output data generated for each organizing unit, enabling the system 200 to preserve auxiliary content until the user 202 is ready to engage with it. For example, in the enterprise application context shown in FIG. 3, the persistent state data may track that candidate review, candidate screen, and performance review organizing units have been invoked, may identify which organizing unit is currently active based on user navigation, and/or may maintain the processed data for each organizing unit in separate output states.

At step 420, the method 400 maintains contextual continuity across the interface sections such that subsequent user interactions referencing elements within any interface section are processed with awareness of the user's location within the unified interactive interface, the referenced elements, and previous interactions within the unified interactive interface. This contextual continuity may be implemented through the Contextual Continuity Methodology 212 (FIG. 2), which enables the AI Core Processing Framework 204 to establish and maintain ongoing awareness of the user's location within the interaction matrix. The Matrix Process Network 206 may leverage data received from the Dynamic Generation Architecture 210 to establish the precise input location and context within the matrix by isolating the originating AI Core Processing Framework 204 outputs that generated the specific landscape location and object elements the user 202 interacts with. Since the AI Core Processing Framework 204 outputs are communicated in a defined AI data structure that serves as a shared language between all components of the system 200, the Matrix Process Network 206 may leverage this originating output to dynamically define and precisely communicate supporting contextual data to the AI Core Processing Framework 204.

For example, if the user 202 submits a secondary interaction to modify a candidate's status within the Candidate Review Landscape shown in FIG. 3, the contextual continuity maintained at step 420 enables the system 200 to understand which specific candidate is being modified based on maintained contextual awareness, without requiring explicit specification from the user 202.

The AI data structure schema may remain consistent end-to-end throughout the system 200, from initial entity generation by the AI Core Processing Framework 204, through database storage, to user interface rendering by the Dynamic Generation Architecture 210 and Matrix Landscape Builder 208, and back to AI processing for secondary interactions. For example, when the AI Core Processing Framework 204 generates an entity such as a meal entry (e.g., a banana), the entity may be created using a defined schema that specifies the entity's properties, relationships, and contextual attributes. This same schema may be preserved when the entity is stored in the system database, when the entity is rendered as an interface element within a capability landscape, and when the entity is transmitted back to the AI Core Processing Framework 204 for subsequent processing. Each object within the system 200, including entities, organizing units, and matrix structures, may include embedded contextual attributes that travel with the object throughout the processing pipeline. These contextual attributes may include, for example, processing instructions from the associated organizing unit, detection criteria, relationship information, and historical interaction data. When the user 202 interacts with an object in the unified interactive interface, the Matrix Process Network 206 may send the object back to the AI Core Processing Framework 204 in the same schema the AI originally used to create it, along with contextual attributes from the organizing unit and matrix structures. This end-to-end schema consistency may enable the system 200 to process minimal user inputs with full contextual awareness. For example, when a user 202 interacts with a banana meal entry in a wellness application and simply inputs "2," the AI Core Processing Framework 204 may understand that this input means "update to 2 bananas" because the full object context, including the banana entity's properties, its organizing unit's processing instructions, and the matrix structure's contextual data, is included in the payload transmitted to the AI. The AI Core Processing Framework 204 may then calculate downstream effects, such as corresponding caloric impacts, based on the organizing unit's contextual properties without requiring the user 202 to explicitly specify what is being modified or provide supporting details. This object-aware approach may differ from text-based processing approaches that would require explicit user specification of the object being modified and the nature of the modification.

At step 422, the method 400 establishes the dynamic update mechanism for updating interface sections in response to subsequent user interactions while preserving data in other interface sections. In some embodiments, the dynamic updates may correspond to referenced elements within the interface sections, such that only interface sections containing elements explicitly referenced by the user interaction are updated. In other embodiments, the dynamic updates may affect interface sections based on other criteria, such as logical relationships between organizing units, data dependencies, and/or system-determined relevance, without requiring that the updated interface sections correspond to explicitly referenced elements. For example, an update to one interface section may trigger cascading updates to related interface sections even when those related sections were not directly referenced by the user interaction. This dynamic update mechanism may be implemented through the Continuous Evolution Framework 214 (FIG. 2), which enables continuous evolution and responsiveness within the AI Interaction Matrix system 200. Step 422 defines how the system 200 processes secondary interactions when they occur during subsequent iterations of the method 400. When a secondary interaction is processed (as part of a subsequent pass through steps 402-422), the Matrix Process Network 206 may define supporting instructions and contextual data for AI Core Processing Framework 204 processing, leveraging the contextual continuity maintained at step 420. The complexity of the secondary interaction may determine the extent of matrix modification required. For simple secondary interactions, the method 400 may process basic modifications to specific interface elements, while complex secondary interactions may trigger broader matrix landscape changes affecting multiple interface sections. The Dynamic Generation Architecture 210 may parse the AI Core Processing Framework 204 output to determine which organizing units should be added, modified, or removed, how existing data should be modified or overridden, and what newly processed data should be incorporated. The Matrix Landscape Builder 208 may then update the relevant interface sections while preserving data in other interface sections that are not affected by the secondary interaction. For example, in the enterprise application context shown in FIG. 3, if the user 202 modifies candidate information in the Candidate Review Landscape, the method 400 may update that specific interface section while preserving the data and state of the Candidate Screen Landscape and Messaging Landscape.

At step 424, the method 400 determines whether there is a secondary interaction. A secondary interaction may occur when the user 202 submits modifications or updates within the existing interaction matrix, such as changing previously entered information, requesting additional processing, or navigating between different organizing units. If a secondary interaction is detected (Yes branch from step 424), the method 400 returns to step 402 to process the secondary interaction within the context of the existing matrix. During this subsequent processing cycle, the dynamic update mechanism established at step 422 is invoked to update the relevant interface sections while preserving data in unaffected sections. The secondary interaction may follow the same processing steps as the initial interaction, but may benefit from the established matrix landscape context and maintained contextual continuity. The Matrix Process Network 206 may recognize the secondary interaction as occurring within an existing interaction matrix rather than initiating a new matrix interaction, enabling the system 200 to process the secondary interaction with full awareness of the user's journey and previous interactions. If no secondary interaction is detected (No branch from step 424), the method 400 may terminate the interaction matrix, completing the processing cycle.

The Matrix Process Network 206 and Continuous Evolution Framework 214 (FIG. 2) may support sub-processes within individual interface sections. Sub-processes may comprise multi-step processes, including conditional steps, that enable users to continue working with AI through structured workflows within each interface section. This approach may be characterized as a "workflow within a workflow," where the user 202 progresses through multiple steps within a single interface section while data in other interface sections persists throughout the sub-process. The AI Core Processing Framework 204 may maintain contextual continuity through every step of the sub-process, enabling the system 200 to process each step with awareness of the user's location within the sub-process, previous steps completed, and the broader matrix landscape context.

In some embodiments, sub-processes may be pre-defined with static structural parameters. For example, referring to FIG. 3, a Performance Review capability may include a pre-defined sub-process where the interface section progresses through a series of steps. The sub-process may begin with a "Select Employees for Review" interface, and after the user 202 submits a selection (triggering a secondary interaction), the system 200 may update that same interface section to display a "Select 360 Feedback Participants" screen. The sub-process may continue through additional steps such as "Review Draft Feedback" and "Finalize Review" screens. Throughout this multi-step workflow, each step may be triggered by secondary interactions that update only the Performance Review interface section, while other interface sections in the matrix landscape, such as the Candidate Review Landscape and Messaging Landscape, persist with their data intact.

In some embodiments, sub-processes may be dynamically generated based on AI processing. For a given interface section, the AI Core Processing Framework 204 may generate interface component definitions (workspace definitions) that specify "Next Step" actions to be executed upon user interaction. For example, the interface component definitions may specify a "sendToManager" action as the next step to route a completed form to a manager, or a "queryView" action to call up a subsequent page displaying query results. Alternatively, the user 202 may directly request a next step via a secondary interaction, such as requesting that a given form be sent to a manager. In response to such a request, the AI Core Processing Framework 204 may select an appropriate action from the AIM catalog, such as the "sendToManager" action, and the Dynamic Generation Architecture 210 may update the interface section accordingly while preserving data in other interface sections.

Referring to FIG. 4, sub-processes may integrate with the broader method 400 flow through the secondary interaction mechanism. Each step within a sub-process may be processed as a secondary interaction, returning to step 402 for processing while the system 200 maintains awareness that the interaction is part of an ongoing sub-process within a specific interface section. The Matrix Process Network 206 may track the sub-process state, including which step the user 202 is currently on and which steps have been completed. The contextual continuity maintained at step 420 may encompass sub-process context, enabling the AI Core Processing Framework 204 to process each step with awareness of the sub-process workflow and the user's progress within it. The dynamic update mechanism established at step 422 may update the interface section to reflect the current sub-process step while preserving data in other interface sections that are not part of the sub-process.

The method 400 demonstrates how embodiments of the present invention may process complex user interactions spanning multiple functional domains while supporting both pre-defined capabilities and dynamically-created organizing units. The method 400 enables the system 200 to adapt to novel use cases by creating new organizing units on-demand while maintaining consistent processing workflows for structured output generation. Through the combination of dynamic organizing unit creation, contextual continuity maintenance, and continuous evolution capabilities, the method 400 enables truly responsive and adaptive AI-driven user experiences that can evolve based on user requirements while maintaining persistent state data and contextual awareness throughout the interaction journey.

Embodiments of the present invention may implement variations of the method 400 that omit certain steps while maintaining core functionality. For example, some embodiments may omit step 424 and the associated secondary interaction processing, implementing the method 400 as a single-pass processing approach where the interaction matrix terminates after the initial interface generation and user interaction without supporting iterative refinement. Other embodiments may omit steps 408-412 entirely, implementing only pre-defined capabilities without dynamic organizing unit creation functionality. Some embodiments may omit step 418, implementing simplified state management that does not track active, pending, and completed organizing units separately. Embodiments may also omit step 420, implementing basic processing without the contextual continuity mechanisms that enable awareness of user location and previous interactions. The specific steps included in any particular embodiment may depend on the application requirements, with enterprise applications potentially implementing the full method 400 to support complex workflows, while simpler consumer applications may implement a subset of steps focused on basic input processing and interface generation.

Organizing units serve as functional containers that group related data, processing logic, and interface components for specific domains within the system 200. These organizing units may exist along a spectrum of implementation approaches, ranging from pre-defined capabilities with static structural parameters at one end to dynamically-created master objects with parameters generated in response to inputs at the other end. The system 200 may analyze input to identify a plurality of organizing units relevant to the input, with each organizing unit corresponding to a distinct functional domain.

At one end of the spectrum, organizing units may comprise pre-defined capabilities, each capability having static structural parameters comprising pre-configured data structures, interface components, and processing instructions. These capabilities may be configured at system design time with fixed structural elements that provide rapid deployment for known use cases, consistent user experiences, and predictable system behavior suitable for regulated environments such as enterprise, healthcare, and/or finance applications. The pre-configured data schemas may include fixed database tables with predetermined columns, data types, and/or constraints optimized for query performance and data integrity, while pre-built interface components may include standardized user interface elements specifically designed for the capability's functional domain.

At the other end of the spectrum, organizing units may comprise dynamically-created master objects generated in response to input (e.g., user input). A master object may include a container structure created during processing of the input, contextual properties generated based on requirements gathered from the user, and/or entity definitions specifying types of data objects to be stored within the master object. The contextual properties may include instructions and/or metadata embedded in master objects that enable future AI processing, such as purpose descriptions, processing instructions that guide AI interpretation of related inputs, and/or detection details that specify activation phrases and input hints triggering identification of the master object. The entity definitions may specify flexible schemas with properties defined at runtime, allowing relationships to be established dynamically through metadata rather than through predetermined foreign keys and/or junction tables.

Between these endpoints, hybrid implementations may combine defined and dynamic components. Such hybrid approaches may include core organizing units implemented as pre-defined capabilities for known functional domains, while supplementary organizing units may be implemented as master objects created as needed for user-specific requirements. The system 200 may categorize organizing units based on their implementation approach, enabling the Matrix Process Network 206 to apply appropriate processing methodologies for each type, with pre-defined capabilities processed using established instruction sets and dynamically-created master objects processed using contextual properties and/or entity definitions generated during the master object's creation process.

In some embodiments, objects may serve as data storage structures containing user information within organizing units, representing a spectrum of implementation approaches from pre-configured database tables to dynamic primitives with flexible schemas. In embodiments that implement organizing units, objects may comprise pre-configured database tables with fixed schemas created at system design time, utilizing standard relational database design with predetermined columns, data types, and/or constraints optimized for query performance and data integrity. In other embodiments, objects may comprise dynamic primitives with flexible schemas defined at runtime based on user needs, enabling the creation of data storage structures on-demand and allowing users to define entirely new functional domains through conversational requirements gathering. Some embodiments of the system 200 may omit organizing units entirely and instead process inputs directly against pre-defined capabilities without the intermediate organizing unit abstraction layer.

As described above in connection with steps 408-412 of the method 400, when an organizing unit does not exist within a system database, the system may enter a requirements gathering mode to obtain information from the user regarding desired functionality. The artificial intelligence processing framework may generate an object model specification based on the obtained information, comprising a data structure schema, contextual properties defining processing instructions, and/or interface component definitions. The system may then transform this specification into database operations using one of two distinct approaches: physical schema transformation and/or logical schema transformation.

The physical schema transformation approach may execute physical schema changes using data definition language (DDL) statements to create new database tables and relationships. For example, when creating a wellness tracking organizing unit, the system may generate separate tables for meals, activities, and/or body metrics, each with columns corresponding to the properties specified in the entity definitions. This approach may provide native database performance, standard SQL querying capabilities, and/or referential integrity enforcement.

Alternatively, the logical schema transformation approach may create logical schema changes using metadata-driven virtual schemas without modifying underlying database structures. This approach may utilize generic storage tables that accommodate any entity type through flexible JSON columns, with entity definitions stored as metadata that the application layer interprets when presenting structured data to users. The logical schema approach may enable instant deployment of new organizing units without requiring database migrations, providing maximum flexibility for rapid changes, though it may involve more complex query logic and/or application-layer schema validation compared to the physical schema approach.

Both transformation approaches may support the dynamic creation of organizing units while maintaining consistent processing workflows for structured output generation. The choice between approaches may depend on factors such as performance requirements, deployment complexity, regulatory compliance needs, and/or the frequency of schema changes expected within the system.

The system 200 may include an AIM Catalog that contains operations the system may perform in response to AI processing results. The AIM Catalog may represent a spectrum of implementation approaches ranging from pre-built actions coded at development time to dynamically generated actions created on-demand based on organizing unit specifications.

The generic action templates may include several types of operations. A CreateEntity action may be used for adding new data objects within organizing units, receiving parameters such as an organizing unit identifier, entity type specification, and/or property data. An UpdateEntity action may be used for modifying existing data objects, while a DeleteEntity action may be used for removing data objects from organizing units. A CreateRelation action may be used for establishing connections between entities within or across organizing units, enabling the system 200 to maintain complex data relationships dynamically without requiring pre-defined relationship structures. A CreateWorkspace action may be used for generating interface configurations based on organizing unit specifications, producing user interfaces comprising dynamic panels with form components, display components, and/or navigation components. An ExecuteProcess action may be used for running workflow logic that may span multiple entities and/or organizing units.

The generic action approach may provide a technical innovation where generic actions combined with organizing unit context may deliver functionality equivalent to specific pre-built actions while maintaining infinite extensibility. For example, a CreateEntity action with meal-specific parameters and context may provide the same functionality as a dedicated CreateMeal action, but with the flexibility to support any type of entity creation through the same underlying mechanism.

The AIM Catalog may support hybrid implementations that combine both pre-built and dynamic actions within the same system. In such implementations, core functionality may utilize pre-built actions for performance and/or reliability, while extensibility features may leverage dynamic actions for flexibility and/or adaptability to emerging requirements.

Embodiments of the system 200 may implement instruction sets that guide AI processing by providing domain-specific knowledge and processing rules. These instruction sets may exist along a spectrum from pre-configured instructions to dynamically generated context-derived instructions. Pre-configured instructions may be crafted by domain experts during system design and embedded within organizing unit definitions, such as domain-specific processing rules for parsing meal descriptions or calculating caloric intake. In embodiments implementing dynamically created organizing units, the system 200 may generate context-derived instructions during organizing unit creation through the requirements gathering process described in connection with steps 408-410 of the method 400. The artificial intelligence processing framework may synthesize user requirements into processing instructions that are stored as contextual properties within the organizing unit's metadata structure.

Contextual data may provide supplementary information that enriches AI processing by filling gaps outside specific interactions. This contextual data may range from predetermined context scoped to pre-defined organizing units (such as user historical data, preferences, and previous interaction patterns) to object-derived context derived from organizing unit properties and relationships (such as purpose descriptions, processing instructions, and detection details). The contextual data may comprise detection criteria stored as metadata, including activation phrases and input hints that trigger matching between input and organizing units. The detection process for identifying relevant organizing units is described in detail in the subsequent section.

The contextual continuity methodology may maintain context through AI data structures that serve as a shared language between system components, enabling precise communication of originating context. When generating an instruction set specific to an organizing unit based on retrieved contextual data, the system 200 may combine the organizing unit's stored processing instructions with current interaction context to create comprehensive guidance for AI processing, enabling the AI processing framework to maintain awareness of both the organizing unit's intended functionality and the user's current position within the interaction matrix.

Embodiments of the system 200 may implement a detection process that may identify which organizing units are relevant to inputs through different approaches depending on the processing model employed. In Model 1 implementations, the system 200 may consolidate detection and processing into a single, central AI agent that compares inputs against capability definitions or master object contextual properties using a comprehensive instruction set. In Model 2 implementations, the system 200 may execute a two-stage detection agent process. In the first stage, a detection AI may analyze the input and compare it against detection criteria, which may include activation phrases, input hints stored as metadata, descriptive metadata associated with pre-defined capabilities, and/or other detection criteria. In the second stage, one or more processing AI agents may process the input against the identified organizing units. The Model 2 approach may provide enhanced scalability and adaptability compared to Model 1, as the detection AI may generate supporting data such as dynamic AI expertise to enrich and tailor the instructions and context data for subsequent processing. Both Model 1 and Model 2 approaches may be applied to static embodiments using pre-defined capabilities and dynamic embodiments using dynamically-created master objects.

In static embodiments, the capability matching process may operate by comparing input (e.g., user input) against pre-configured capability definitions, each including descriptive metadata indicating the functional domain and scope. The system 200 may perform keyword analysis, semantic analysis, and/or other matching techniques to identify which capabilities match the input content. For example, when processing an input about meals and physical activities, the system 200 may identify both meal tracking and activity tracking capabilities as relevant based on the semantic content matching the descriptive metadata.

In dynamic embodiments, the system 200 may execute a detection agent process to determine whether input relates to an existing master object by comparing the input against contextual properties of master objects in the catalog. The detection details within each master object's contextual properties may include activation phrases (specific words or terms that may trigger identification), input hints (semantic descriptions of content or scenarios that may activate the master object), and/or other detection criteria. For example, a wellness tracking master object may include activation phrases such as "food," "meal," "ate," "calories," "exercise," and/or "workout," along with input hints such as "mentions specific food items," "references physical activities," and/or other semantic indicators.

When the detection agent identifies a matching master object, the system 200 may proceed with processing the input using that master object's contextual properties, processing instructions, and/or other associated data. When no matching master object is identified, the system 200 may enter requirements gathering mode to obtain additional information from the user regarding desired functionality, enabling the creation of a new master object tailored to the user's specific needs.

This detection process may enable the system 200 to dynamically route inputs (e.g., user inputs) to appropriate organizing units while maintaining the flexibility to create new functional domains when existing master objects may not adequately address the user's requirements. The detection criteria stored as metadata within master objects may provide a self-documenting and evolvable detection mechanism that may adapt as new master objects are created, existing ones are modified based on usage patterns, and/or other system changes occur. When the detection process identifies a matching organizing unit, the detection output may include one or more AIM Catalog actions selected based on the organizing unit's instructions. For example, when detecting a meal-related input against a wellness organizing unit, the organizing unit's instructions may specify that new meal entries should use a createMeal or createEntity action, and this action selection may be included in the detection output.

The requirements gathering mode and master object creation process described in steps 408-412 of the method 400 may enable the system 200 to dynamically expand its functional capabilities based on user needs. The requirements gathering mode may implement a multi-turn conversational approach where the system 200 conducts multiple exchanges with the user 202 to understand their specific needs. For example, when the user 202 mentions tracking activities that do not correspond to existing organizing units, the system 200 may ask clarifying questions such as "What specific information would you like to track?", "How would you like to organize and view this data?", and/or other questions to gather requirements.

The artificial intelligence processing framework may synthesize the user's responses into an object model specification that encompasses all aspects of the new organizing unit, including master object metadata (name, description, and/or contextual properties), entity definitions (base types, properties schemas, and/or contextual processing instructions), relation definitions, view definitions, and/or workspace definitions (the view definitions and workspace definitions collectively comprising the interface component definitions for user interaction with the organizing unit). Following the database transformation at step 412, the system 200 may update a catalog of master objects to include the new master object with its contextual properties and detection criteria, enabling future detection processes to identify and match inputs (e.g., user inputs) against the newly created organizing unit.

The Matrix Process Network 206 may perform a pre-processing phase where contextual data and instruction sets are retrieved and assembled for each identified organizing unit, as described above. For pre-defined capabilities, the Matrix Process Network 206 may retrieve pre-configured instruction sets established during system design along with user historical data within the relevant capabilities. For dynamically-created master objects, the Matrix Process Network 206 may retrieve contextual properties generated during the master object creation process, including processing instructions derived from user requirements, and/or entity definitions. The Matrix Process Network 206 may also retrieve the schema associated with the AIM Catalog action (s) selected during the detection process. For example, when the detection output specifies a createMeal action, the pre-processing stage may retrieve the JSON schema associated with that action and incorporate it into the output specifications provided to the AI Core Processing Framework 204. The Matrix Process Network 206 may package the assembled data into a comprehensive data structure for transmission to the AI Core Processing Framework 204, including the original input, organizing unit identifiers, instructions or contextual properties, contextual data, and output specifications defining the schema into which the AI Core Processing Framework 204 should populate processed results.

Following a Processing stage in which the AI Core Processing Framework 204 generates structured outputs based on contextual properties associated with each organizing unit, the transformation process may represent a subsequent stage where those structured outputs may be converted into executable backend operations that create and modify database structures. This transformation may enable the system 200 to dynamically generate organizing units and their associated data structures based on AI-processed specifications. The transformation approach may vary depending on the implementation model.

In static embodiment transformation implementations, structured outputs from the AI Core Processing Framework 204 may map directly to backend service methods that execute database operations against pre-configured tables. When the AI generates capability-specific outputs, these outputs may correspond to predefined actions that invoke specific backend services. For example, a meal-related output may trigger a CreateMeal action that maps to a MealService.createMeal( ) method, which may execute database operations against pre-existing meal tables with established schemas, relationships, and/or constraints. This approach may leverage traditional three-tier architecture with strong typing and compile-time validation, enabling transaction management through object-relational mapping patterns.

In dynamic embodiment implementations, the transformation process may operate on object model specifications generated by the AI Core Processing Framework 204 to create organizing units dynamically. As described above, the system 200 may implement this transformation through either physical schema transformation using data definition language statements and/or logical schema transformation using metadata-driven virtual schemas. The choice between approaches may depend on factors such as performance requirements, deployment complexity, and/or the frequency of schema changes expected within the system.

The transformation process may ensure that organizing units created through either approach maintain compatibility with the broader system architecture. Regardless of the transformation method employed, the resulting database structures may support the contextual properties, entity definitions, and/or interface component definitions specified in the object model specification, enabling the Matrix Landscape Builder 208 to generate appropriate user interfaces and the Matrix Process Network 206 to maintain contextual continuity across dynamically created organizing units.

The Dynamic Generation Architecture 210 may interpret workspace configurations to create user interfaces that adapt dynamically to the specific organizing units and their associated data structures. The system 200 may implement two distinct approaches to user interface generation, each offering different levels of flexibility and customization based on the underlying organizing unit architecture.

In static embodiments utilizing pre-defined capabilities, the Matrix Landscape Builder 208 may access pre-built capability landscape templates that correspond to specific functional domains. For example, when processing meal-related data, the Matrix Landscape Builder 208 may access a pre-built meal tracking template that includes form fields for food items, nutritional information, and/or timing data, then populate these templates with structured output data received from the AI Core Processing Framework 204.

In dynamic embodiments utilizing dynamically-created master objects, the Dynamic Generation Architecture 210 may interpret workspace specifications from object model specifications to generate dynamic panels with conditional display logic. The Matrix Landscape Builder 208 may generate interfaces using pre-configured component-level scaffolds or field-level scaffolds through the Dynamic Assembly Framework 218 for creating ad-hoc widgets. For example, when a user requires a custom data entry form for tracking meditation sessions, the Dynamic Assembly Framework 218 may generate an ad-hoc widget containing duration fields, quality rating selectors, and/or note-taking areas assembled from individual field-level components.

The frontend may render dynamic panels using generic component libraries that provide standardized interface elements capable of adapting to various data structures and interaction patterns. These component libraries may include a DynamicFormPanel component for rendering data entry interfaces, a DynamicTablePanel component for displaying structured data in tabular formats, a DynamicChartPanel component for presenting data visualizations, and/or DynamicActionButtons components for providing user interaction controls. Each component may receive configuration data from the Dynamic Generation Architecture 210 that specifies the component's appearance, behavior, and/or data binding requirements.

Referring to FIG. 4, the method 400 includes steps 418 and 420 that demonstrate persistent state management and contextual continuity capabilities. These capabilities, which are described in detail in the description above on the Contextual Continuity Methodology (CCM) 212 and the Matrix Process Network 206, apply equally to both static embodiments with pre-defined capabilities and dynamic embodiments with dynamically-created master objects.

The Matrix Process Network 206 may maintain the same state categories for both embodiment types: an invoked capabilities state identifying all organizing units invoked by the input, an active capability state identifying which organizing unit the user is currently interacting with, a pending capabilities state identifying organizing units awaiting user interaction, and/or capability-specific output states preserving the structured output data for each organizing unit.

The contextual continuity methodology may maintain context through AI data structures that serve as a shared language between system components, as described above in connection with the Contextual Continuity Methodology (CCM) 212. This may enable the system 200 to process secondary interactions with full awareness of the user's location within the unified interactive interface, the specific elements being referenced, and/or previous interactions—allowing natural language modifications such as changing "one banana" to "two bananas" without requiring explicit specification of which item is being modified. The persistence methodology may preserve auxiliary content within the matrix until users are ready to engage with it, enabling flexible navigation without data loss.

The Matrix Landscape Builder 208 may function as a master-level component that contains elements spanning multiple capabilities within the AI Interaction Matrix system 200, as described above. The Matrix Landscape Builder 208 may house UI components, data structures, technical functions, and/or processing elements needed for different capabilities, functioning as a master template that may be dynamically assembled to meet specific interaction requirements.

In static embodiments, the Matrix Landscape Builder 208 may access pre-configured widgets associated with each capability that serve as building blocks for capability landscapes. For example, meal tracking capabilities may have associated interface elements including nutritional data displays and/or meal entry forms, while activity tracking capabilities may have associated interface elements including exercise logging forms and/or performance metrics displays.

The Dynamic Assembly Framework 218 may enhance the Matrix Landscape Builder 208 by enabling AI to assemble entirely unique elements on-the-fly, transcending the limitations of pre-configured components. The Dynamic Assembly Framework 218 may break down scaffolds from component level to individual field levels, creating ad-hoc widgets based on specific interaction requirements. For example, rather than using a pre-configured meal entry widget, the Dynamic Assembly Framework 218 may enable the AI to select individual fields such as a food name text input, a calorie number input, a meal type dropdown selector, and/or a timestamp picker, then combine these elements into a unique interface configuration.

The Matrix Landscape Builder 208 may include assembly logic for combining selected interface elements into capability-specific landscapes, determining how elements are arranged, styled, and/or connected to create cohesive user experiences. Through the Dynamic Assembly Framework 218, the Matrix Landscape Builder 208 may create ad-hoc widgets tailored to unique interaction scenarios. For example, if a user submits an input requiring a combination of meal tracking, activity logging, and/or medication reminders, the Dynamic Assembly Framework 218 may enable the Matrix Landscape Builder 208 to create a unique interface that combines field-level elements from multiple capability domains into a single, cohesive landscape.

In static embodiments, interface sections within the unified interactive interface may be pre-defined with arrangements established at system design time. For example, the arrangement may align one interface section per organizing unit, or may follow other pre-configured logic determined during system configuration.

In dynamic embodiments, the AI processing stage outputs may include properties that govern interface arrangement. For example, workspace definitions generated by the AI Core Processing Framework 204 may include ordinal values that specify the sequence and positioning of interface sections within the unified interactive interface. The frontend may use these ordinal values to structure the workflow arrangement, determining the order in which interface sections are presented and how they are organized relative to one another.

The Processing AI may have flexibility in assigning ordinal values to workspace definitions. In some embodiments, the Processing AI may follow base-level logic provided in implementation-level instructions to determine initial ordinal assignments. The Processing AI may also adapt ordinal assignments based on user preferences saved in contextual data as organizing units evolve over time, enabling the interface arrangement to reflect learned user behaviors and preferences.

For navigation between interface sections, the system 200 may implement the Capability Assignment Framework described above, which supports multiple approaches including predefined order where users establish preferred processing sequences in advance, simultaneous activation where multiple interface sections function concurrently, and/or on-demand selection where users dynamically select and switch between interface sections based on their immediate needs.

The Continuous Evolution Framework 214 may enable ongoing user engagement by processing secondary interactions within existing matrices, as described above and demonstrated in steps 422 and 424 of the method 400. The framework may monitor user interactions within capability landscapes, allowing the system 200 to detect when users submit modifications, and/or updates to previously processed information.

When a secondary interaction is detected, the Matrix Process Network 206 may process the modification within the context of the existing capability states, and the Dynamic Generation Architecture 210 and Matrix Landscape Builder 208 may work together to refresh the affected capability landscapes. For example, when a meal entry is modified, the meals capability landscape may update to show the revised nutritional information while preserving data and interface states for other capabilities such as activity tracking, and/or metrics monitoring.

The method 100 may support three categories of interactions as described in the "Input Received By Matrix Process Network" section above: Matrix Interactions that generate new interaction matrices, Secondary Interactions that occur within existing matrices and primarily interact with established elements, and/or Secondary Matrix Interactions that support a broader scope of influence and may reshape the overall matrix landscape by adding, modifying, and/or removing capabilities based on evolving user needs.

The system 200 may implement an interstitial data support mechanism that enables users to review and modify AI-processed data before committing changes to permanent storage. When the AI Core Processing Framework 204 processes inputs (e.g., user inputs) and generates structured output data, the system 200 may create interstitial data comprising replicated copies of the entities that would be stored in the system database. These interstitial entities maintain the same data structure and content as their corresponding original entities but are marked with status flags indicating their pending confirmation state. For example, when processing a meal entry input, the system 200 may generate an interstitial meal entity containing the AI-processed food information, nutritional data, and/or timing details while preserving any existing meal entities in their original state.

The Dynamic Generation Architecture 210 and Matrix Landscape Builder 208 may present the interstitial data in the unified interactive interface for user review and modification. The interface sections may display the interstitial entities alongside interface controls that enable users to edit fields, add additional entities, remove entities, and/or adjust relationships between entities, with visual indicators distinguishing pending entities from confirmed entities. The Matrix Process Network 206 may track these modifications and maintain the updated interstitial data in temporary storage states until user confirmation occurs.

Upon user confirmation, the system 200 may apply modifications from the interstitial data to the original entities by persisting the interstitial entities with a confirmed status. This confirmation process may involve updating the status flags of the interstitial entities and transferring their data to the permanent storage structures within the system database. The confirmed interstitial entities may then become the authoritative data records for subsequent interactions, while any unconfirmed interstitial entities may be discarded and/or archived according to system policies.

This interstitial data mechanism supports the system's Persistence Methodology by preserving auxiliary content within the matrix until users are ready to engage with it, enabling flexible navigation between different capability landscapes while maintaining interstitial modifications before committing changes to permanent storage.

The system 200 may include an agentic layer that may operate as an extension of the matrix process network 206 to enable proactive background processing and autonomous workflow evolution, as described in the "Proactive Interactions Framework" section above. The agentic layer may function independently of direct user interaction, executing background processes that may monitor user data and contextual information to anticipate user needs and evolve workflows autonomously. The agentic layer may implement background APIs that continuously feed data to AI agents reviewing the user's journey state to identify deltas between the current state and the matrix landscape. When a delta is detected, the agentic layer may process this delta as a secondary interaction to evolve the user experience proactively. If no meaningful delta is found, the background monitoring process may continue without intervention.

The agentic layer may leverage a cost-effective architecture where initial delta processing may be performed by smaller AI models to control computational expenses. When these smaller models detect meaningful changes or identify opportunities for proactive enhancement, the processing may be forwarded to more capable AI models for comprehensive analysis and implementation. This tiered approach may enable continuous monitoring while managing resource utilization effectively.

The agentic layer may monitor user data and contextual information in background processes that may operate continuously without disrupting the user's active workflow. For example, the agentic layer may monitor document content changes, calendar updates, project status modifications, and/or data entry patterns to identify situations where proactive system intervention could enhance the user experience. Based on the monitored data, the agentic layer may proactively generate new entities or modify existing entities to anticipate user needs, autonomously creating new data objects, updating existing information, and/or establishing new relationships between entities based on detected patterns or contextual changes.

The agentic layer may update user interfaces to reflect proactively generated or modified entities, ensuring that users may be presented with current and relevant information without requiring manual refresh or navigation actions. When the agentic layer generates new entities or modifies existing ones, the corresponding interface sections may be automatically updated to display the new or modified information, maintaining the contextual continuity and persistent state management that characterizes the overall system architecture.

The agentic layer may further integrate with the sub-process capabilities described above to dynamically construct and execute entire sub-processes on-the-fly within the Matrix context. For example, when the agentic layer detects a delta or identifies an opportunity for proactive enhancement, it may generate not only individual entity updates but also complete multi-step workflows comprising conditional steps, interface transitions, and data transformations. This capability may enable the system 200 to autonomously build linear workflows within individual interface sections while simultaneously coordinating horizontal workflows across multiple interface sections. The combination of these capabilities may provide multi-level workflow orchestration, where inputs may spread workflows horizontally across interface sections through the Matrix Landscape Builder 208 (FIG. 2) and the Dynamic Generation Architecture 210, while also progressing linearly within each interface section through dynamically generated sub-processes.

This multi-level approach may represent an advancement over conventional linear agent workflows by situating autonomous agent activities within the broader Matrix context, enabling the agentic layer to leverage the contextual continuity maintained by the Contextual Continuity Methodology 212 (FIG. 2), the persistent state management of the Matrix Process Network 206, and the dynamic interface generation capabilities of the Dynamic Assembly Framework 218 when constructing and executing sub-processes. Through this integration, the agentic layer may deliver sophisticated, context-aware workflow automation that adapts to the user's position within the interaction matrix while maintaining awareness of both the horizontal scope across organizing units and the linear progression within individual interface sections.

Embodiments of the system 200 may support multiple users simultaneously interacting with shared organizing units through a membership layer that may define user permissions and workspace sharing. The membership layer may implement a membership structure that may associate user identifiers with specific organizing units and may define their respective roles and permissions. Each membership entry may include a user identifier, a role designation such as "owner," "editor," and/or "viewer," and/or a permissions array specifying the actions that user may perform. The permissions system may control read access to view data, write access to create or modify entities, and/or administrative access to manage the organizing unit's structure and membership.

The system 200 may enable various collaborative scenarios through the membership layer. For example, in a healthcare context, a nutritionist may be granted viewer permissions to a client's meal tracking organizing unit, enabling review of meal logs without the ability to modify data. In a team project management scenario, multiple team members may be granted editor permissions to a shared project tracking organizing unit, while the project manager may retain owner permissions to manage structure and membership. Family household management represents another scenario where family members may share access to household organizing units such as grocery lists and/or calendar events with different permission levels based on roles.

The system 200 may implement technical mechanisms to support real-time synchronization of workspace updates across multiple users through the Matrix Process Network 206 and Dynamic Generation Architecture 210. Conflict resolution mechanisms may address situations where multiple users attempt to modify the same data simultaneously, implementing strategies such as last-write-wins approaches and/or merging algorithms that may combine changes from multiple users. The system 200 may also maintain audit trails recording user actions within shared organizing units, including timestamps, user identifiers, and/or descriptions of actions performed.

The membership layer may integrate with the existing contextual continuity and state management mechanisms of the system 200, ensuring that collaborative interactions may maintain the same level of contextual awareness and persistent state management as single-user interactions. When processing inputs from users within shared organizing units, the Matrix Process Network 206 may incorporate membership and permission information into the contextual data provided to the AI Core Processing Framework 204, enabling the AI to understand the collaborative context and generate appropriate responses based on the user's permissions and role within the organizing unit.

Embodiments of the system 200 may extend beyond single applications to operating system level coordination, enabling unified orchestration of workflows across multiple separate applications simultaneously. In such implementations, the Matrix Process Network 206 may coordinate complex workflows that span document processing applications, presentation software, media applications, e-commerce platforms, and/or calendar management systems through a single user interaction. The cross-application orchestration capabilities may enable a single input to trigger coordinated actions across multiple separate applications with unified workspace management, with each application receiving app-specific instructions tailored to its particular functionality while maintaining coordination with the broader workflow established by the system 200.

In operating system level implementations, the system 200 may create master objects with entity types that span application boundaries. These master objects may include project metadata that defines the overall scope and objectives, research documents that contain gathered information and analysis, presentations that organize findings for communication, calendar events that structure project timelines and milestones, and/or notes that capture insights and observations throughout the research process. The Matrix Process Network 206 may orchestrate these cross-application workflows by interfacing with application programming interfaces (APIs) of the various involved applications, with each application receiving app-specific instructions formatted and structured according to that application's particular requirements and capabilities.

Unified workspaces generated by the Dynamic Generation Architecture 210 may display progress and status information across all involved applications, providing users with a consolidated view of their multi-application workflow. As shown in FIG. 3, the system may present multiple landscape views that enable users to monitor and interact with different aspects of their cross-application project simultaneously. Contextual continuity may be maintained across application boundaries through shared authentication and permissions systems that enable the Matrix Process Network 206 to coordinate user access across multiple applications. Cross-application data synchronization may ensure that updates made in one application are reflected appropriately in related applications, and the system 200 may maintain unified AI context that spans applications, enabling the AI Core Processing Framework 204 to understand relationships and dependencies between activities occurring in different applications.

The system 200 may support implementation across multiple devices simultaneously while maintaining contextual continuity and synchronized state management. The Matrix Process Network 206 may coordinate workflows that span desktop computers, mobile devices, tablets, and/or other connected devices, ensuring that users may access and interact with their cross-application workflows from any device while maintaining consistent state information and contextual awareness. Dynamic input chaining may enable outputs from one capability to recursively serve as inputs for subsequent interactions across different applications. For example, key figures identified during document research may automatically serve as inputs for slide creation in presentation software, while those same figures may inform playlist generation parameters in media applications, creating interconnected workflows that adapt and evolve based on the content and progress of the overall project.

Embodiments of the present invention may implement a pure static configuration where all organizing units comprise pre-defined capabilities with static structural parameters. In such embodiments, a system for processing multi-capability inputs may include a matrix process network executing on a processor that maintains a plurality of pre-defined capabilities. Each capability may comprise a capability identifier, processing instructions defining how to interpret inputs related to the capability, data structures for storing capability-specific data, and interface components for user interaction. For example, in an enterprise HR recruiting platform implementation, the system may include pre-configured capabilities such as candidate review, phone screen management, and performance review drafting, each with fixed data schemas comprising predetermined database tables, columns, data types, and constraints optimized for specific HR workflows.

For each invoked capability, the matrix process network may define an instruction set and contextual data specific to that capability. The instruction sets may comprise AIE-crafted expertise developed by domain experts during system design. For instance, the candidate review capability may include specialized instructions for parsing candidate qualifications and evaluating fit against job requirements. An AI core processing framework executing on the processor may receive the input, instruction sets, and contextual data from the matrix process network, parse the input to extract capability-specific information, and generate structured output data according to AI data structure schemas defined by the matrix process network.

The structured output data may be returned to the matrix process network, which may then coordinate the generation of pre-built capability landscapes through the dynamic generation architecture and matrix landscape builder. Each capability landscape may comprise pre-configured interface components, including forms, tables, charts, and action buttons specifically designed for that capability's workflows. For example, the candidate review landscape may include standardized candidate evaluation forms and ranking tables, while the performance review landscape may include structured review templates and rating interfaces. The system may provide immediate functionality without requiring configuration or setup, enabling rapid deployment for known use cases.

Embodiments of the system 200 may implement a pure dynamic configuration where all organizing units comprise dynamically-created master objects, all objects comprise dynamic primitives with virtual schemas, all actions comprise generic operations, all instruction sets are context-derived from requirements, and all user interfaces comprise dynamic panels generated from object model specifications. This embodiment may be particularly suitable for consumer personal organization platforms where users begin with blank slates and create functional domains on-demand. When a user 202 submits an input to the system 200, the Matrix Process Network 206 may execute a detection agent to compare the input against detection criteria of master objects stored in a catalog maintained by the system 200.

When the detection agent does not identify a matching master object for the input, the system 200 may enter a requirements gathering mode to obtain information from the user 202 regarding desired functionality through a multi-turn conversational process. For example, when a user 202 mentions travel planning but no travel-related master object exists, the system 200 may engage in conversational requirements gathering to understand what aspects of travel the user 202 wants to track. The AI Core Processing Framework 204 may generate an object model specification based on the obtained information, comprising master object metadata, entity definitions, relation definitions, view definitions, and workspace definitions.

The system 200 may transform the object model specification into executable database operations to create the organizing unit within a system database, either through physical schema changes using data definition language statements or logical schema changes using metadata-driven virtual schemas. Through this approach, users may create trip planning master objects with entity types for destinations, flights, hotels, and itineraries, recipe collection master objects with entities for recipes, ingredients, and meal plans, reading list master objects with entities for books, quotes, and notes, and custom objects for hobbies, projects, and goals.

When the detection agent identifies a matching master object for subsequent inputs, the system 200 may retrieve the contextual properties and entity definitions of the matching master object. The system 200 may process the input using the AI Core Processing Framework 204 according to the processing instructions to generate structured entity data conforming to the entity definitions. The system 200 may execute a CreateEntity action to generate a new entity within the matching master object and execute a CreateWorkspace action to generate a user interface comprising dynamic panels based on workspace specifications associated with the existing master object.

Embodiments of the system 200 may implement a hybrid approach that combines pre-defined capabilities for established functional domains with dynamically-created master objects for user-customized extensions. In a hybrid embodiment, the system 200 may include core organizing units implemented as pre-defined capabilities that address common, well-established functional domains. For example, in a consumer wellness application, the system 200 may ship with pre-built capabilities for meal tracking, physical activity logging, and body metrics monitoring. The hybrid embodiment may simultaneously support supplementary organizing units implemented as dynamically-created master objects that enable users to extend the system 200 beyond its pre-configured domains, such as a “Mindfulness” master object for meditation tracking.

The detection process in hybrid embodiments may operate through a unified detection agent that evaluates inputs against both pre-defined capabilities and existing master objects. The Matrix Process Network 206 may implement detection logic that first compares inputs against the activation criteria of established capabilities, then evaluates the input against the contextual properties and detection criteria of any user-created master objects. Data management in hybrid implementations may combine pre-configured database tables for core capabilities with dynamic data structures for master objects, maintaining traditional relational database schemas for established domains while implementing the logical schema approach with flexible JSON structures for master objects.

The AI data structures methodology in hybrid embodiments may implement the tiered data model architecture across both capability types. Level One may define matrix landscapes encompassing both pre-defined capabilities and master objects within a single interaction. Level Two may assemble capability landscapes using pre-configured scaffolds for established capabilities while dynamically generating interface components for master objects. Interface generation in hybrid embodiments may present unified experiences that seamlessly integrate pre-built and dynamically-generated components, with the Matrix Landscape Builder 208 accessing both pre-configured UI templates and generating custom interface sections for master objects.

The hybrid approach may provide progressive disclosure of complexity, presenting users with familiar, polished interfaces for common tasks while offering advanced customization capabilities for specialized needs. The contextual continuity mechanisms in hybrid embodiments may operate seamlessly across both capability types, maintaining user context and interaction history regardless of whether users are engaging with pre-defined capabilities or custom master objects.

The following use case illustrates how the system 200 may process the same complex input through both static and dynamic implementation approaches, demonstrating the distinct characteristics of each method.

In a static implementation using pre-configured capabilities, the wellness application may be initially configured with predefined capabilities including Meals, Activity, My Metrics, and Chat. When a user submits a complex many-to-many input such as “Busy morning! Had my usual smoothie for breakfast and 2 slices of pepperoni pizza for lunch. Also got in a 5-mile run and lost a pound since yesterday. Any healthy chicken pasta ideas for dinner?”, the Matrix Process Network 206 identifies the input as spanning multiple pre-configured capabilities, matching food-related content to the Meals capability, exercise content to the Activity capability, weight information to the My Metrics capability, and the recipe request to the Chat capability. The Dynamic Generation Architecture 210 orchestrates the creation of capability landscapes using pre-built interface components, assembling a unified matrix landscape that presents each capability with dedicated landscape sections displaying parsed data, calculated metrics, and recommendations.

In contrast, a dynamic implementation using dynamic master objects begins with no pre-configured wellness-related organizing units. When the same input is submitted, the system’s detection agent finds no existing master objects that match food, activity, or weight references, triggering the system to enter requirements gathering mode. The system may respond with “I notice you mentioned meals, physical activity, and your weight. Would you like me to help you track your wellness?” Upon user confirmation, the system continues the requirements gathering dialogue, asking "What specifically would you like to track?" The AI Core Processing Framework 204 synthesizes the user's responses into an object model specification that defines a "Wellness Tracking" master object with entity definitions for meals, activities, and body metrics, contextual properties for future processing, and detection criteria for recognizing wellness-related inputs. The system transforms this specification into database operations and generates interface sections dynamically based on the master object specification.

The comparison between these approaches reveals several distinctions. The static approach provides immediate functionality with no setup required and a consistent user experience through pre-built components, but requires substantial upfront development effort and limits user customization to configuration of existing features. The dynamic approach requires an initial requirements gathering conversation but provides flexibility for users to define entirely custom tracking domains, with development effort concentrated in creating the generic framework rather than specific capabilities. Performance characteristics may vary, with static implementations benefiting from optimized database schemas while dynamic implementations may experience different performance profiles depending on the schema transformation approach employed. The static approach may be optimal for commercial products with well-defined use cases or regulatory compliance requirements, while the dynamic approach may be more suitable for personal organization tools or contexts where users require custom tracking domains. Both approaches maintain the core benefits of the AI Interaction Matrix system, including contextual continuity, persistent state management, and the ability to process complex many-to-many inputs through unified interaction frameworks.

Embodiments of the present invention address the technical problem of how to enable AI-driven systems to dynamically create and manage functional domains in response to inputs while maintaining contextual continuity and persistent state across interactions. Existing AI interface systems implement capabilities as isolated, pre-configured components that require substantial upfront development effort and limit users to predetermined functional domains. When users require functionality outside these pre-configured domains, traditional systems cannot accommodate such requests without additional development cycles.

The technical solution provided by embodiments of the present invention involves a matrix process network that receives natural language inputs spanning one or more functional domains and analyzes the inputs to identify relevant organizing units. When an organizing unit does not exist within a system database, the system enters a requirements gathering mode to obtain information from the user regarding desired functionality. An artificial intelligence processing framework generates a specification for creating the organizing unit based on the obtained information, the specification comprising a data structure schema, contextual properties defining processing instructions, and interface component definitions. The system transforms this specification into executable database operations to create the organizing unit within the system database, enabling the system to dynamically expand its functional capabilities based on user needs without requiring pre-configuration.

The technical effect achieved by this solution includes the ability to process inputs against dynamically-created organizing units using the same contextual continuity mechanisms and persistent state management as pre-defined capabilities. The unified interactive interface dynamically generated by the system presents interface sections corresponding to each identified organizing unit, whether predefined or dynamically created, while maintaining awareness of the user's location within the interface, referenced elements, and previous interactions. This enables subsequent user interactions to be processed with full contextual awareness, and interface sections to be dynamically updated in response to user interactions while preserving data in other interface sections.

Embodiments of the present invention may include features that may be rooted in computer technology and may provide improvements to computer functionality. The Matrix Process Network 206 may implement specific technical processes for maintaining persistent states through establishing and managing distinct capability states, parsing and storing capability-specific output states, maintaining auxiliary content persistence until user engagement, and coordinating state transitions across multiple capabilities. These state management operations may involve tracking and coordinating data across multiple system components in real-time, which may not be practically capable of being performed in the human mind or through manual processes.

The system 200 may provide concrete technical improvements through its implementation of contextual continuity mechanisms that may capture starting inputs while simultaneously determining instruction sets and contextual data, maintain location awareness through defined technical states, implement specific data structures for context preservation, and route contextual data between system components through defined schemas. The AI data structures methodology may implement a tiered data model architecture that may enable seamless communication between the AI Core Processing Framework 204, Matrix Process Network 206, and Dynamic Generation Architecture 210, providing a shared language that may unify communication between these core system components.

The Dynamic Assembly Framework 218 may enable AI to assemble entirely unique interface elements on-the-fly by breaking down scaffolds from component level to individual field levels, creating ad-hoc widgets based on specific interaction requirements. This dynamic interface generation may transcend the limitations of pre-configured components and may represent a technical improvement over traditional static interface systems that may require pre-built components for each functional domain.

The transformation of object model specifications into executable database operations, whether through physical schema changes using data definition language statements or logical schema changes using metadata-driven virtual schemas, may represent a technical process that may enable the system 200 to dynamically expand its functional capabilities without requiring manual database administration or development cycles. The detection agent process that may compare inputs against contextual properties of master objects in the catalog, including activation phrases and input hints stored as metadata, may implement specific technical mechanisms for routing inputs to appropriate organizing units while maintaining the flexibility to create new functional domains when existing master objects may not adequately address user requirements.

The present disclosure provides a method performed by at least one computer processor executing computer program instructions stored on at least one non-transitory computer-readable medium. The method includes receiving, by a matrix process network executing on a processor, an input comprising natural language content spanning at least one functional domain. The method further includes analyzing the input to identify a plurality of organizing units relevant to the input. For each identified organizing unit, the method includes processing the input using the artificial intelligence processing framework according to contextual properties associated with the organizing unit to generate structured output data. The method also includes dynamically generating a unified interactive interface comprising interface sections, each interface section populated with the structured output data and assembled according to interface component definitions for user interaction with the organizing unit. The method further includes maintaining contextual continuity across the interface sections such that subsequent user interactions referencing elements within any interface section are processed with awareness of the user's location within the unified interactive interface, the referenced elements, and previous interactions within the unified interactive interface. Additionally, the method includes dynamically updating the interface sections in response to the subsequent user interactions while preserving data in other interface sections.

In some embodiments, for at least one organizing unit that does not exist within a system database, the method further includes entering a requirements gathering mode to obtain additional information from a user regarding desired functionality. The method may also include generating, by an artificial intelligence processing framework, a specification for creating the organizing unit based on the obtained information, the specification comprising a data structure schema defining storage structures for data associated with the organizing unit, contextual properties defining processing instructions for future interactions with the organizing unit, and interface component definitions for user interaction with the organizing unit. The method may further include transforming the specification into executable database operations to create the organizing unit within the system database.

In some embodiments, the method further includes maintaining persistent state data tracking active, pending, and completed organizing units throughout the user interaction. In some embodiments, the organizing units comprise pre-defined capabilities, each capability having static structural parameters comprising pre-configured data structures, interface components, and processing instructions. In some embodiments, at least one organizing unit comprises a dynamically-created master object generated in response to the input. The master object may comprise a container structure created during processing of the input, contextual properties generated based on requirements gathered from the user, and entity definitions specifying types of data objects to be stored within the master object. In some embodiments, generating the dynamically-created master object comprises entering a requirements gathering mode to obtain information from the user regarding desired functionality, generating, by the artificial intelligence processing framework, an object model specification based on the obtained information, and transforming the object model specification into database operations to create database structures for the master object. In some embodiments, transforming the object model specification comprises executing physical schema changes using data definition language statements to create new database tables and relationships. In some embodiments, transforming the object model specification comprises creating logical schema changes using metadata-driven virtual schemas without modifying underlying database structures. In some embodiments, processing the input using the artificial intelligence processing framework comprises retrieving contextual data associated with the organizing unit, the contextual data comprising detection criteria stored as metadata, and generating an instruction set specific to the organizing unit based on the retrieved contextual data. Identifying organizing units relevant to the input may comprise executing a detection agent to compare the input against the detection criteria of each organizing unit. In some embodiments, the at least one functional domain comprises a plurality of functional domains, and each organizing unit of the plurality of organizing units corresponds to a different one of the plurality of functional domains.

The present disclosure also provides a system comprising at least one non-transitory computer readable medium having computer program instructions stored thereon, the computer program instructions being executable by at least one computer processor to perform a method. The method includes receiving, by a matrix process network executing on a processor, an input comprising natural language content spanning at least one functional domain. The method further includes analyzing the input to identify a plurality of organizing units relevant to the input. For each identified organizing unit, the method includes processing the input using the artificial intelligence processing framework according to contextual properties associated with the organizing unit to generate structured output data. The method also includes dynamically generating a unified interactive interface comprising interface sections, each interface section populated with the structured output data and assembled according to interface component definitions. The method further includes maintaining contextual continuity across the interface sections such that subsequent user interactions referencing elements within any interface section are processed with awareness of the user's location within the unified interactive interface, the referenced elements, and previous interactions within the unified interactive interface. Additionally, the method includes dynamically updating the interface sections in response to the subsequent user interactions while preserving data in other interface sections.

In some embodiments of the system, for at least one organizing unit that does not exist within a system database, the method further includes entering a requirements gathering mode to obtain additional information from a user regarding desired functionality. The method may also include generating, by an artificial intelligence processing framework, a specification for creating the organizing unit based on the obtained information, the specification comprising a data structure schema defining storage structures for data associated with the organizing unit, contextual properties defining processing instructions for future interactions with the organizing unit, and interface component definitions for user interaction with the organizing unit. The method may further include transforming the specification into executable database operations to create the organizing unit within the system database.

In some embodiments of the system, the method further includes maintaining persistent state data tracking active, pending, and completed organizing units throughout the user interaction. In some embodiments of the system, the organizing units comprise pre-defined capabilities, each capability having static structural parameters comprising pre-configured data structures, interface components, and processing instructions. In some embodiments of the system, at least one organizing unit comprises a dynamically-created master object generated in response to the input. The master object may comprise a container structure created during processing of the input, contextual properties generated based on requirements gathered from the user, and entity definitions specifying types of data objects to be stored within the master object. In some embodiments of the system, generating the dynamically-created master object comprises entering a requirements gathering mode to obtain information from the user regarding desired functionality, generating, by the artificial intelligence processing framework, an object model specification based on the obtained information, and transforming the object model specification into database operations to create database structures for the master object. In some embodiments of the system, transforming the object model specification comprises executing physical schema changes using data definition language statements to create new database tables and relationships. In some embodiments of the system, transforming the object model specification comprises creating logical schema changes using metadata-driven virtual schemas without modifying underlying database structures. In some embodiments of the system, processing the input using the artificial intelligence processing framework comprises retrieving contextual data associated with the organizing unit, the contextual data comprising detection criteria stored as metadata, and generating an instruction set specific to the organizing unit based on the retrieved contextual data. Identifying organizing units relevant to the input may comprise executing a detection agent to compare the input against the detection criteria of each organizing unit. In some embodiments of the system, the at least one functional domain comprises a plurality of functional domains, and each organizing unit of the plurality of organizing units corresponds to a different one of the plurality of functional domains.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, the Matrix Process Network (MPN) provides concrete technical improvements through its implementation as a collection of specific processes, actions, states, and components of the AI Interaction Matrix system. The MPN implements specific technical processes for maintaining persistent states through establishing and managing distinct capability states (invoked, active, pending), parsing and storing capability-specific output states, maintaining auxiliary content persistence until user engagement, and coordinating state transitions across multiple capabilities.

The MPN architecture provides concrete contextual continuity implementation by capturing starting inputs while simultaneously determining instruction sets and contextual data, maintaining "location" awareness through defined technical states, implementing specific data structures for context preservation, and routing contextual data between system components through defined schemas. The MPN addresses fragmented architectures through specific technical solutions by implementing a unified communication infrastructure between the AI Core Processing Framework and Dynamic Generation Architecture, providing structured data schematics through a tiered data model architecture, enabling seamless data flow between components through standardized formats, and coordinating multiple AI frameworks through defined processing protocols.

The MPN architecture demonstrates practical application through concrete technical implementations including defined instruction schemas that guide AI processing, specific data structures for maintaining persistent states, concrete processes for parsing and routing capability data, and technical frameworks for coordinating multiple AI components. Unlike traditional GUI systems, in which actions are page-specific and isolated, the MPN provides specific technical improvements by evaluating actions holistically within the broader system context, maintaining persistent data states across interactions, implementing defined protocols for cross-capability coordination, and providing concrete mechanisms for state management and context preservation. These concrete implementations provide specific solutions to technical problems in computer architecture, demonstrating clear improvements over traditional approaches that lack unified frameworks for maintaining context and coordinating multiple AI capabilities.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element (s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

Embodiments of the present invention may implement the artificial intelligence processing framework, AI agents, and other AI components using any of a variety of AI technologies. For example, the AI Core Processing Framework 204 (FIG. 2), the detection agent, the Capability Identification AI, the Capability Processing AI, and other AI components disclosed herein may be implemented using any one or more of the following, in any combination: machine learning models, deep learning models, neural networks, transformer-based models, large language models, generative AI models, autoregressive models, natural language processing systems, and/or natural language understanding systems. The AI components may, for example, process natural language inputs, generate structured outputs, identify organizing units relevant to inputs, generate specifications for creating organizing units, and/or perform other functions disclosed herein. In some embodiments, the AI components may include pre-trained models, fine-tuned models, and/or models trained on domain-specific data. The AI components may operate locally on user devices, remotely on server infrastructure, and/or in a distributed manner across multiple computing resources.

AI components disclosed herein that are given different names, such as the detection agent, the Capability Identification AI, and the Capability Processing AI, may be implemented using a single component or multiple components. For example, in some embodiments, a single language model may perform the functions attributed to multiple named AI components. In other embodiments, each named AI component may be implemented using a distinct language model, neural network, and/or other AI technology. The multiple components may differ from each other in any of a variety of ways, including, for example, model architecture, parameter count, training data, fine-tuning approach, inference speed, computational requirements, and/or deployment location. As a particular example, the Capability Identification AI and the Capability Processing AI described in Model 2 implementations may be implemented using the same underlying language model with different instruction sets, or may be implemented using different language models where the Capability Identification AI uses a smaller, faster model for initial analysis and the Capability Processing AI uses a larger, more capable model for detailed processing.

Any language model that may be used to implement functions disclosed herein may (unless otherwise specified) include one or more language models, such as any one or more of the following, in any combination: a generative language model; an autoregressive language model; a transformer-based language model; a neural network language model. Any such language model may, for example, include at least 1 billion parameters, at least 10 billion parameters, at least 100 billion parameters, at least 500 billion parameters, at least 1 trillion parameters, at least 5 trillion parameters, at least 25 trillion parameters, at least 50 trillion parameters, or at least 100 trillion parameters. Any such language model may, unless otherwise specified, have a size of a least 1 gigabyte, at least 10 gigabytes, at least 100 gigabytes, at least 500 gigabytes, at least 1 terabyte, at least 10 terabytes, at least 100 terabytes, or at least 1 petabyte. Any such language model may, for example, include one or more of each of the types of language models above, unless otherwise specified. As a particular example, any language model disclosed herein may, unless otherwise specified, be or include any one or more of the following language models, in any combination:

- Any language model in the GPT-n series of language models (such as GPT-1, GPT-2, GPT-3, GPT-3.5, GPT-4, GPT-4 Turbo, or GPT-5) available from OpenAI Incorporated of San Francisco, California;
- any version of the Language Model for Dialogue Applications (LaMDA), Generalist Language Model (GLaM), Pathways Language Model (PaLM or PaLM 2), or Gemini (also known as Bard or Gemini 1, 1.5, or 2 series), available from Google LLC of Mountain View, California;
- any version of the Gopher language model or Chinchilla language model, available from DeepMind Technologies of London, United Kingdom;
- any version of the Turing-NLG (Turing Natural Language Generation) language model or Phi series (such as Phi-1, Phi-2, Phi-3), available from Microsoft Corporation of Redmond, Washington;
- any version of the Megatron Language Model (Megatron-LM) or Megatron-Turing NLG model, available from Nvidia Corporation of Santa Clara, California;
- any version of the Large Language Model Meta AI (LLaMA), including LLaMA 2 or LLaMA 3, available from Meta Platforms, Inc. of Menlo Park, California;
- any version of the Claude language model (such as Claude 1, 2, 3, or 4), available from Anthropic PBC of San Francisco, California;
- any version of the Mistral or Mixtral language models, available from Mistral AI SAS of Paris, France; or
- any version of the Grok language model, available from xAI Corporation of San Francisco, California.

Embodiments of the present invention may implement real-time processing capabilities in various contexts. As used herein, the term "real-time" may refer to an output being generated within no more than a maximum amount of time of receipt of a corresponding input. Such maximum amounts of time may include, for example, no more than 1 millisecond, no more than 10 milliseconds, no more than 100 milliseconds, no more than 1 second, no more than 5 seconds, no more than 10 seconds, no more than 30 seconds, no more than 1 minute, and/or no more than 5 minutes. For example, the Matrix Process Network 206 may receive inputs and generate enriched data packages for transmission to the AI Core Processing Framework 204 in real-time. The AI Core Processing Framework 204 may process inputs and generate structured output data in real-time. The Dynamic Generation Architecture 210 may dynamically generate capability landscapes in real-time in response to processed outputs. The Matrix Landscape Builder 208 may assemble and present interface components in real-time based on capability-specific output states. The Contextual Continuity Methodology 212 may maintain and update contextual awareness in real-time as users navigate between different interface sections. The Continuous Evolution Framework 214 may process secondary interactions and update matrix landscapes in real-time. The Proactive Interactions Framework 216 may detect deltas between current states and matrix landscapes and trigger updates in real-time. The detection agent may compare inputs against detection criteria of organizing units and identify matching master objects in real-time.

Embodiments of the present invention may process data structures and perform operations at scales and speeds that demonstrate that embodiments of the present invention are necessarily rooted in computer technology and cannot practically be performed by a human mind. For example, the Matrix Process Network 206 may receive and process natural language inputs comprising at least 100 characters, at least 500 characters, at least 1,000 characters, at least 5,000 characters, or at least 10,000 characters, analyze the inputs against detection criteria of multiple organizing units, generate enriched data packages including instruction sets and contextual data, and transmit the enriched data packages to the AI Core Processing Framework 204 in less than 1 second, less than 500 milliseconds, less than 100 milliseconds, or less than 10 milliseconds. The AI Core Processing Framework 204 may process complex many-to-many inputs spanning multiple functional domains, identify relevant organizing units, generate structured output data according to defined AI data structure schemas, and return consolidated capability-specific outputs in less than 10 seconds, less than 5 seconds, less than 1 second, or less than 500 milliseconds. The Dynamic Generation Architecture 210 may parse processed outputs, assemble interface components from the Matrix Landscape Builder 208, and dynamically generate unified interactive interfaces comprising multiple capability landscapes in less than 5 seconds, less than 2 seconds, less than 1 second, or less than 500 milliseconds. The system 200 may maintain persistent state data tracking active, pending, and completed organizing units across at least 10 simultaneous user interactions, at least 50 simultaneous user interactions, at least 100 simultaneous user interactions, at least 500 simultaneous user interactions, or at least 1,000 simultaneous user interactions while preserving contextual continuity for each user session. The detection agent may compare inputs against contextual properties of organizing units stored in a catalog comprising at least 100 master objects, at least 500 master objects, at least 1,000 master objects, at least 5,000 master objects, or at least 10,000 master objects, evaluating activation phrases and input hints to identify matching organizing units in less than 1 second, less than 500 milliseconds, less than 100 milliseconds, or less than 10 milliseconds. The transformation of object model specifications into executable database operations may create new database structures comprising multiple tables, relationships, and metadata entries in less than 10 seconds, less than 5 seconds, less than 3 seconds, less than 1 second, or less than 500 milliseconds.

What is claimed is:

1. A method performed by at least one computer processor executing computer program instructions stored on at least one non-transitory computer-readable medium, the method comprising:

- receiving, by a matrix process network executing on a processor, an input comprising natural language content spanning a plurality of functional domains;
- analyzing the input to identify a plurality of organizing units relevant to the input, each organizing unit comprising a functional container grouping related data, processing logic, and interface components for a respective functional domain, wherein each organizing unit of the plurality of organizing units corresponds to a different one of the plurality of functional domains;
- for each identified organizing unit, processing the input using the artificial intelligence processing framework according to contextual properties associated with the organizing unit to generate structured output data;

dynamically generating a unified interactive interface comprising interface sections, each interface section populated with the structured output data and assembled according to interface component definitions for user interaction with the organizing unit;

receiving a subsequent interaction referencing one of the plurality of organizing units;

maintaining contextual continuity across the interface sections such that the subsequent interaction referencing the one of the plurality of organizing units within the unified interactive interface is processed with awareness of the user's location within the unified interactive interface, the referenced organizing unit, and previous interactions within the unified interactive interface; and dynamically updating the interface section corresponding to the referenced organizing unit in response to the subsequent interaction while preserving data in other interface sections.

2. The method of claim 1, further comprising, for at least one organizing unit that does not exist within a system database:

entering a requirements gathering mode to obtain additional information from a user regarding desired functionality;

generating, by an artificial intelligence processing framework, a specification for creating the organizing unit based on the obtained information, the specification comprising: (i) a data structure schema defining storage structures for data associated with the organizing unit, (ii) contextual properties defining processing instructions for future interactions with the organizing unit, and (iii) interface component definitions for user interaction with the organizing unit;

transforming the specification into executable database operations to create the organizing unit within the system database.

3. The method of claim 1, further comprising:

maintaining persistent state data tracking active, pending, and completed organizing units throughout the user interaction.

4. The method of claim 1, wherein the organizing units comprise pre-defined capabilities, each capability having static structural parameters comprising pre-configured data structures, interface components, and processing instructions.

5. The method of claim 1, wherein at least one organizing unit comprises a dynamically-created master object generated in response to the input, the master object comprising:

a container structure created during processing of the input;

contextual properties generated based on requirements gathered from the user; and entity definitions specifying types of data objects to be stored within the master object.

6. The method of claim 5, wherein generating the dynamically-created master object comprises:

entering a requirements gathering mode to obtain information from the user regarding desired functionality;

generating, by the artificial intelligence processing framework, an object model specification based on the obtained information;

transforming the object model specification into database operations to create database structures for the master object.

7. The method of claim 6, wherein transforming the object model specification comprises executing physical schema changes using data definition language statements to create new database tables and relationships.

8. The method of claim 6, wherein transforming the object model specification comprises creating logical schema changes using metadata-driven virtual schemas without modifying underlying database structures.

9. The method of claim 1, wherein processing the input using the artificial intelligence processing framework comprises:

retrieving contextual data associated with the organizing unit, the contextual data comprising detection criteria stored as metadata;

generating an instruction set specific to the organizing unit based on the retrieved contextual data; and wherein identifying organizing units relevant to the input comprises executing a detection agent to compare the input against the detection criteria of each organizing unit.

10. A system comprising at least one non-transitory computer readable medium having computer program instructions stored thereon, the computer program instructions being executable by at least one computer processor to perform a method, the method comprising:

receiving, by a matrix process network executing on a processor, an input comprising natural language content spanning a plurality of functional domains;

analyzing the input to identify a plurality of organizing units relevant to the input, each organizing unit comprising a functional container grouping related data, processing logic, and interface components for a respective functional domain, wherein each organizing unit of the plurality of organizing units corresponds to a different one of the plurality of functional domains;

for each identified organizing unit, processing the input using the artificial intelligence processing framework according to contextual properties associated with the organizing unit to generate structured output data;

dynamically generating a unified interactive interface comprising interface sections, each interface section populated with the structured output data and assembled according to interface component definitions;

receiving a subsequent interaction referencing one of the plurality of organizing units;

maintaining contextual continuity across the interface sections such that the subsequent interaction referencing the one of the plurality of organizing units within the unified interactive interface is processed with awareness of the user's location within the unified interactive interface, the referenced organizing unit, and previous interactions within the unified interactive interface; and dynamically updating the interface section corresponding to the referenced organizing unit in response to the subsequent interaction while preserving data in other interface sections.

11. The system of claim 10, wherein the method further comprises, for at least one organizing unit that does not exist within a system database:

entering a requirements gathering mode to obtain additional information from a user regarding desired functionality;

generating, by an artificial intelligence processing framework, a specification for creating the organizing unit based on the obtained information, the specification comprising: (i) a data structure schema defining storage structures for data associated with the organizing unit, (ii) contextual properties defining processing instructions for future interactions with the organizing unit, and (iii) interface component definitions for user interaction with the organizing unit;

transforming the specification into executable database operations to create the organizing unit within the system database.

12. The system of claim 10, wherein the method further comprises:

maintaining persistent state data tracking active, pending, and completed organizing units throughout the user interaction.

13. The system of claim 10, wherein the organizing units comprise pre-defined capabilities, each capability having static structural parameters comprising pre-configured data structures, interface components, and processing instructions.

14. The system of claim 10, wherein at least one organizing unit comprises a dynamically-created master object generated in response to the input, the master object comprising:

a container structure created during processing of the input;

contextual properties generated based on requirements gathered from the user; and entity definitions specifying types of data objects to be stored within the master object.

15. The system of claim 14, wherein generating the dynamically-created master object comprises:

entering a requirements gathering mode to obtain information from the user regarding desired functionality;

generating, by the artificial intelligence processing framework, an object model specification based on the obtained information;

transforming the object model specification into database operations to create database structures for the master object.

16. The system of claim 15, wherein transforming the object model specification comprises executing physical schema changes using data definition language statements to create new database tables and relationships.

17. The system of claim 15, wherein transforming the object model specification comprises creating logical schema changes using metadata-driven virtual schemas without modifying underlying database structures.

18. The system of claim 10, wherein processing the input using the artificial intelligence processing framework comprises:

retrieving contextual data associated with the organizing unit, the contextual data comprising detection criteria stored as metadata;

generating an instruction set specific to the organizing unit based on the retrieved contextual data; and wherein identifying organizing units relevant to the input comprises executing a detection agent to compare the input against the detection criteria of each organizing unit.

* * * * *